(12) United States Patent
Robertson et al.

(10) Patent No.: US 6,594,799 B1
(45) Date of Patent: Jul. 15, 2003

(54) METHOD AND SYSTEM FOR FACILITATING ELECTRONIC CIRCUIT AND CHIP DESIGN USING REMOTELY LOCATED RESOURCES

(75) Inventors: William H. Robertson, Los Altos, CA (US); James M. Plymale, Beaverton, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/514,757

(22) Filed: Feb. 28, 2000

(51) Int. Cl.[7] ............................................. G06F 17/50
(52) U.S. Cl. ........................................... 716/1; 707/10
(58) Field of Search ................................ 716/1; 707/10

(56) References Cited

U.S. PATENT DOCUMENTS

| | | | |
|---|---|---|---|
| 5,862,223 A | 1/1999 | Walker et al. | ............... 380/25 |
| 5,878,408 A | 3/1999 | McDonald et al. | |
| 5,933,356 A | 8/1999 | Rostoker et al. | |
| 6,058,426 A | 5/2000 | Godwin et al. | |
| 6,102,961 A | 8/2000 | Lee et al. | |
| 6,141,724 A | 10/2000 | Butler et al. | |
| 6,269,467 B1 | 7/2001 | Chang et al. | |

FOREIGN PATENT DOCUMENTS

| | | |
|---|---|---|
| EP | 0433066 | 6/1991 |
| EP | 0944002 | 9/1999 |
| EP | 1063599 | 12/2000 |
| WO | WO 0165423 | 9/2001 |

OTHER PUBLICATIONS

Lee, Dong–Eun, et al., "CADIC: computer–aided design on internet with cryptosystem", Oct. 1998, IEEE, pp. 2670–2674.*

Dieckman, D. et al., "DISCOE: distributed design and analysis to preserve intellectual property", Sep. 1998, IEEE, pp. 57–60.*

Brglz, F. et al., "A universal client for distributed netwrked design and computing", Jun. 2001, IEEE, pp. 401–406.*

Delpasso, M et al., "Virtual simulation of distributed IP–based designs", Jun. 1999, IEEE, pp. 50–55.*

Orfali, Robert et al., The essential client/server survival guide, 1996, Katherine Showalter, 2nd ed., pp. 228–233, and 476.*

(List continued on next page.)

*Primary Examiner*—John F. Niebling
*Assistant Examiner*—Stacy Whitmore
(74) *Attorney, Agent, or Firm*—Bingham McCutchen LLP

(57) ABSTRACT

A multi-faceted portal site acts as a server in the context of an n-tier client/server network, and connects electronic designers and design teams to design and verification tool and service providers on the other through a single portal site. Tools and services accessible to users through the portal site include electronic design automation (EDA) software tools, electronic component information, electronic component databases of parts (or dynamic parts), computing and processing resources, virtual circuit blocks, design expert assistance, and integrated circuit fabrication. Such tools and services may be provided in whole or part by suppliers connected to the portal site. Users accessing the portal site are presented with options in a menu or other convenient format identifying the tools and services available, and are able to more rapidly complete circuit designs by having access to a wide variety of tools and services in a single locale. The portal site may facilitate purchase, lease or other acquisition of the tools and services offered through it. The portal site tracks the movements of users through the portal site in order to learn about the design preferences and design approaches of users individually and in the aggregate. Previous actions taken by the user and by similarly-situated users may be considered in determining which information presented to the user, or in what order to present information to the user, thereby providing contextually-driven access.

64 Claims, 10 Drawing Sheets

OTHER PUBLICATIONS

Benini, L. et al., "Distributed EDA tool integration: the PPP paradigm," Proceedings of the International Conference on Computer Design, Oct. 1996, IEEE, pp. 448–453.

Larson, N. et al., "Managing Design Processes: A Risk Management Approach," Nov. 1996, IEEE, pp. 749–759.

Zorian, Y., "Test requirements for embedded core-based systems and IEEE P1500," Nov. 1997, IEEE, pp. 191–197.

Blanchard, D., "EDA on the WWW PCB CAD," Printed Circuit Design, Miller Freeman, Feb. 1998, vol. 15, No. 2, pp. 34–37.

Chan et al., "WELD—An Environment for Web-Based Electronic Design," Proceedings of the 35$^{th}$ Design Automation Conference, May 1998, pp. 146–151.

Geppert, L., "The Rising Tide of Web-Based Tools and Services Augurs the Next Sea Change in Electronic Design IC Design on the World Wide Web," IEEE Spectrum, Jun. 1998, vol. 35, No. 6, pp. 45–50.

Moretti, "Got IP," Printed Circuit Design, Miller Freeman, Oct. 1998, vol. 15, No. 10, pp. 31–33.

Dalpasso, M. et al., "Specification and Validation of Distributed IP-based designs with JavaCAD," Mar. 1999, IEEE, pp. 684–688.

Perrin, B., "Web–Based Circuit Engineering," Circuit Cellar Ink, Mar. 1999, No. 104, pp. 28–30, 33, 35, 37–38.

Schindler, P. et al., "IP repository, a Web based IP reuse infrastructure," Custom Integrated Circuits, May 1999, IEEE, pp. 415–418.

Konduri et al., "A Framework for Collaborative and Distributed Web–Based Design," Proceedings of the 36$^{th}$ Design Automation Conference, Jun. 1999, pp. 898–903.

Wilsey, P., "Web–Based Analysis and Distributed IP," Proceedings of the 1999 Winter Simulation Conference, pp. 1445–1453.

Rao et al., "Web–Based Network Analysis and Design," ACM Transactions on Modeling and Computer Simulation, Jan. 2000, vol. 10, Issue 1, pp. 18–38.

Wen et al., "Concurrent–Simulation–Based Remote IP Evaluation over the Internet for System–On–Chip Design," 14$^{th}$ International Symposium on System Synthesis, Sep. 2001, pp. 233–238.

"Specification and validation of distributed IP–based designs with JAVACAD," Delpasso, M. et al., Mar. 1999, IEEE, pp. 57–60.

"Test requirements for embedded core–based systems and IEEE P1500", Zorian, Y., Nov. 1997, IEEE, pp. 191–197.

"Managing design processes: a risk assessment approach," N. Larson et al., Nov. 1996, IEEE, pp. 749–759.

* cited by examiner

METHOD AND SYSTEM FOR FACILITATING ELECTRONIC CIRCUIT AND CHIP DESIGN USING REMOTELY LOCATED RESOURCES

BACKGROUND OF THE INVENTION

1) Field of the Invention

The field of invention is electronic design tools and automation, and more specifically methods and systems for facilitating electronic circuit and chip design using resources accessible over a distributed electronic network such as the Internet.

2) Background

The electronics industry produces ever more advanced chip and circuit designs with the assistance of continuously improving design and verification tools. Chip designs may contain tens or hundreds of thousands of gates per chip, and will soon be in the range of millions of gates per chip. Engineers generally require advanced software tools to lay out a chip design and to help manage the huge volume of information associated therewith.

In a high-level view of the electronic design process, a design team takes a product idea from conception to completion over a period of time referred to as "time-to-market." Increased competition has resulted in immense pressure to reduce time-to-market with new products, because the first company to the market with a new product can typically expect to capture and hold a large market share against later competitors. In this environment, a difference as small as a few days between the planned and the actual shipment of a product may make an enormous difference in its profitability and in the revenue it generates.

In the present environment for designing large scale circuits and complex chips, time and personnel are often short, and budgets are tight. However, design engineers often discover in the middle of the design process that additional tools for automated design and verification are needed, especially if the schedule begins to slip because the team is using tools that are outdated, inadequate for or unsuited to the tasks to be performed, or incompatible with other tools being used. The ability of design engineers to obtain the design tools they need is nevertheless hindered by bureaucratic and cost considerations. Distributors of automated design tools often require purchasers to enter long-term licenses (e.g., 99 years), even though such tools generally have a lifespan of 5 to 10 years before becoming obsolete. Such long-term lease requirements increase design costs and require large capital expenditures by a company. As a result, a long and inefficient purchasing process is typically required in most organizations to purchase such tools. This can lead to delays in obtaining the best tools for the design tasks at hand.

The purchasing process for design and verification tools is inefficient and costly for a variety of reasons. Typically, design engineers have to endure a lengthy internal evaluation and justification procedure for the large capital expenditures involved in obtaining design or verification software. Potential suppliers must be identified and brought in for presentations and demonstrations. Many suppliers perform detailed benchmarks for comparison against one another, and those benchmarks must be evaluated by the responsible members of the design team. Time-consuming supplier negotiations and bureaucratic approval procedures then ensue, before the design team receives authority to order the desired design tool. Despite the slowness of this process, few companies will allow a design team to simply go to a supplier and purchase the tool they want due to the large capital expenditures involved, even though the desired tool is typically the one that is recommended at the end of the evaluation process.

Eventually, when the selection and purchase process has been completed, the design tool must then be installed and tested before use. In the course of this process, weeks or months may be consumed—time that a design team working on a time-critical project can ill afford to waste.

Traditionally, design and verification tools are installed at the end user's site and integrated into the company's existing tool set by an internal computer-aided design (CAD) group whose purpose is to support the engineers. As software tools grow in complexity and diversity, the ability of internal CAD groups to effectively support the most modern design and verification tools diminishes. Further, CAD support personnel are expensive overhead. As a result, an increasing number of companies are choosing not to hire CAD support personnel in order to save money. However, without internal CAD personnel, the individual engineers are left to install and support the tools themselves—a difficult and frustrating proposition that can consume a large number of invaluable working hours.

In addition to high overhead for support personnel, automated design tools also have significant associated hardware costs. Many design and verification programs, particularly simulation programs, require an enormous amount of computing capacity in order to perform their tasks in a reasonable period of time. Thus, after a software tool is selected, additional computer hardware may be required to run it. The need for this additional hardware may not be immediately apparent, causing delays in product development once the need is realized. Further, the design and verification tools may need to be run, albeit critically, for only a few days or weeks, making it potentially inefficient from a capital standpoint to purchase the additional computing power to run such products.

Another drawback with the present way in which design and verification tools are acquired and used relates to technical support. Vendors often have help lines available to users needing technical support for a given software tool. However, assuming that the engineer gets past the frustrating maze of voicemail and one or more layers of less-knowledgeable first-line support personnel which typically characterize vendor help lines, it often takes a long time for the engineer to explain, and for the support personnel to resolve, an issue with a complex tool as applied to a complex circuit. For serious problems, the vendor may send a field applications engineer to the job site, but it is expensive to do so, and several days may pass before a field applications engineer arrives. During that time, the entire design project may remain at a standstill.

A recent trend to increase design speed and efficiency involves the re-use or recycling of electronic circuit blocks or subsystems, which are alternatively referred to as "cores", "virtual component blocks" or "IPs" (an acronym for "Intellectual Properties," which denotes the proprietary nature of these pre-packaged circuit blocks). Once the design for a virtual component block has been tested and verified, it can be re-used in other applications which may be completely distinct from the application which led to its original creation. For example, a subsystem for a cellular phone ASIC may contain a micro-controller as well as a digital signal processor and other components. After the design for the cellular phone subsystem has been tested and verified, it could be re-used (as a virtual component block) in, for example, an automotive application. Design reuse of virtual component blocks allows a designer to complete a design much faster than building the entire design from scratch, and avoids the need for debugging, testing and verification of the subsystems embodied in the virtual component block. Examples of virtual circuit blocks or IP cores that are commercially available at present include Viterbi decoders, microcontrollers, digital/analog converters, and encryption/decryption processors, to name a few.

While virtual circuit blocks (i.e., IP cores) provide a means for reducing time-to-market by allowing for the purchase of standard blocks of code, there are a number of barriers to the convenient sale and use of virtual circuit blocks. With regard to quality assurance, for example, there are few, if any, standard methodologies for a designer to be assured of the quality of a virtual circuit block or its suitability for a particular design. Conversely, there are few, if any, standard methodologies for a seller of virtual circuit blocks to demonstrate the quality of the products to prospective customers. Another barrier is protection of the code and/or data comprising the virtual circuit block. Companies providing virtual circuit blocks are in need of a way to track the usage of their products and to protect the code and/or data in those blocks against theft, and such methodologies are preferably unobtrusive, yet allow full access to information required to incorporate those IP cores into a design. Another issue is data format. A virtual circuit block purchased for use in a circuit design must be compatible with the data formats used in that design. However, standards for interfacing with virtual circuit blocks, if they exist, are still evolving. As a result, becoming familiar with an interface format for a virtual circuit block may require a significant amount of work, as well as integrating a virtual circuit block into a circuit design, thus reducing the time advantage obtained through the use of the virtual circuit block. Transaction overhead in the form of high sales and legal costs also discourages sale and use of virtual circuit blocks. For example, legal review by one or both parties is often required with regard to the licensing of virtual circuit blocks.

Component selection is also an area which suffers from inefficiencies and unnecessary time delays. An engineer may consult printed catalogs put out by component distributors to learn about and select parts, or may, using the Internet, visit a website of a supplier of manufacturer, where information about components may be found, or may use a search engine to try to gather product information on the Internet. However, searching the Internet for individual components can be time-consuming and tedious. Further, current search engines and methodologies are inefficient and incomplete, and may thus return search results that do not include websites offering components that a designer could beneficially use in a design. Engineers also may receive unsolicited data sheets from manufacturers, but such data sheets are often discarded, lost or forgotten about. With increasing pressures to decrease time to market, it has become more difficult for engineers to spend time talking to supplier or distributor sales representatives, exacerbating the problem of information gathering about components.

Another problem experienced with the chip design process is that knowledge concerning design and verification processes is fragmented, and it is difficult to capture and maintain such knowledge. Attempting to discern through observation and study the individual design processes of many individual engineers is very challenging. Moreover, the design process can rarely be discerned from final blueprints or products, and is generally difficult to determine from draft or working documents. Different engineers will approach design in different fashions, which they may not even be able to articulate. Interviewing engineers to obtain data about the engineering design process is likely to be unproductive, and to consume a tremendous amount of time for a comparatively small payoff. Thus, benefits in training and improved methodologies that could result from metrics regarding the engineering design process continue to go unrealized.

Some attempts at addressing problems caused by fragmented design and verification processes involve exclusive partnering arrangements among companies that specialize in different areas of the design and verification process, in order to narrow the range of products and services that need to be learned by engineers and supported by internal technical staff. For example, a partnership of electronic design companies may include a provider of design verification tools, a provider of electronic components, and a company that ties them together. In the partnership model, compatibility issues can be addressed more easily, because a limited number of companies are involved. Further, increased revenue is created by influencing a customer of one partner at one phase of the design process to utilize the products or services of another partner in a different phase of the design process. However, a partnering arrangement drastically reduces the choices available to a design team, and may prevent the most optimum product from being used.

One approach for expediting the design process is to provide certain types of design and verification tools—in particular, FPGA synthesis tools—at a remote computer farm that can be accessed over the Internet. Under this approach, the FPGA synthesis tools are run on a central server farm, or computer farm, owned by a single applications service provider. A server farm, or computer farm, is generally a network of processors that are linked together to accomplish higher intensity computing tasks. In an illustrative system utilizing this approach, the applications service provider rewrites the interface of each offered FPGA synthesis tool in the Java® computing language, allowing usage of the tool on a wide variety of computing platforms and operating systems through standard, commercially available Internet browsers. A drawback of this approach is that the user is limited to the FPGA synthesis tools resident in the server farm of the applications service provider for which interface code has been written. Furthermore, the Java® language is notoriously slow, which can frustrate engineers and slow down the design and verification process.

It would be advantageous to connect participants in the electronic design process, including end users and suppliers, through a single portal site that facilitates information exchange and commercial transactions. It would further be advantageous to make a wide variety of design and verification tools readily and conveniently available to design engineers, and to allow use of such tools without a large initial capital outlay in either software or hardware. It would further be advantageous to provide a mechanism for pooling knowledge and information concerning chip design techniques, applications, products and tools. It would also be advantageous to provide a convenient means for allowing engineers to incorporate virtual circuit blocks into their designs.

SUMMARY OF THE INVENTION

The invention in one aspect provides a multi-faceted portal site allowing connection over a distributed electronic network, such as the Internet, to a plurality of end user systems and suppliers.

In a preferred embodiment, a portal site acts as a server in the context of an n-tier client/server network, and connects electronic designers and design teams to design and verification tool and service providers on the other through a single portal site. Examples of tools and services accessible to users through the portal site include electronic design automation (EDA) software tools, electronic component information, electronic component databases of parts (or dynamic parts), computing and processing resources, virtual circuit blocks, design expert assistance, and integrated circuit fabrication. Such tools and services may be provided in whole or part by suppliers connected to the portal site. Users accessing the portal site are presented with options in a menu or other convenient format identifying the tools and services available, and are able to more rapidly complete circuit designs by having access to a wide variety of tools and services in a single locale. The portal site may facilitate purchase, lease or other acquisition of the tools and services offered through it.

In a preferred embodiment, a portal site tracks the movements of users through the portal site in order to learn about the design preferences and design approaches of users individually and in the aggregate. Previous actions taken by the user and by similarly-situated users may be considered in determining which information presented to the user, or in what order to present information to the user, thereby providing contextually-driven access.

Further embodiments, variations and enhancements are also described herein.

DETAILED DESCRIPTION OF THE PREFERRED EMBODIMENTS

Figure 1:
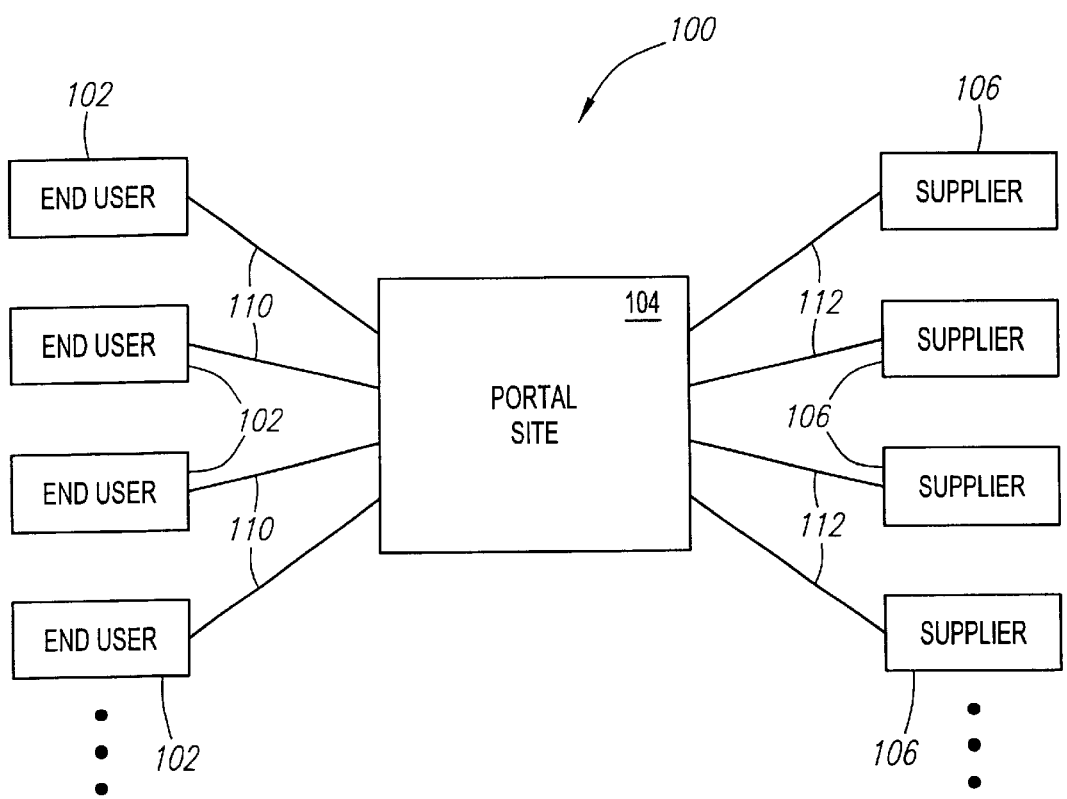
FIG. 1 is an abstract representation of a portal connecting end users and suppliers of electrical design tools and services.

FIG. 1 is an abstract diagram in accordance with a preferred embodiment of a electronic design automation resource system 100 for facilitating electronic design by provision of useful goods, services, information and other resources. As illustrated in FIG. 1, a plurality of end users 102 and a plurality of suppliers 106 are connected, over a distributed electronic network such as the Internet, to a portal site 104. End users 102 would typically include circuit designers and users of electronic design automation (EDA) software tools, but may also include a variety of other types of users, as described in more detail herein. Suppliers 106 typically would include providers of EDA software tools, virtual component blocks or IP cores, foundry services, hardware components, expert design services, and a variety of other resources (whether in the form of goods, services, information or other resources), as further described herein.

In a preferred embodiment, the portal site 104 provides engineers and other users 102 access to information on electronic components, and enables commercial transactions between end users 102 and suppliers 106 of the electronic components. In a particular embodiment, the electronic component data is stored in a remote database in the form of "dynamic parts," having graphical representations with standard symbol and footprint data ready to be transferred (i.e., copied) into an end user's design. Part of the information copied from the remote electronic components database to the end user's workstation (or design database) includes a link to the remote database or a supplier's database, enabling a variety of useful capabilities, including provision of information such as part lead time, availability and cost. Data sheets, timing information and the like regarding the electronic components may also be made available to assist the designer.

In another embodiment, the portal site 104 connects end users 102 who need extra computing power (for example, to run a simulation program) with suppliers 106 who have excess computing resources. The portal site 104 may facilitate the location of computing or processing resources by providing a database of computing/processing sites or resources, and by trying to match up the end user 102 with the most suitable computing/processing site or resource. The end users 102 may select a computing resource supplier 106 based on cost, the type and availability of the supplier's computing resources, or other data made known by the supplier 106.

In another embodiment, the portal site 104 makes design automation tools, such as simulation software, available to end users 102 who need them. The portal site 104 may facilitate the location of needed design automation tools by providing a database of design automation tools, and by trying to match up the end user 102 with the most suitable design automation tool. The supplier 106 of design automation services may offer the design automation tools on a license or other basis, through a transaction carried out via the portal site 104.

In another embodiment, the portal site 104 connects end users 102 who need design assistance with suppliers 106 of expert knowledge, such as professors and consultants, or even expert publications. The portal site 104 may facilitate the search of suitable design experts, by providing a database of design experts and trying to match up the end user 102 with the most suitable design experts.

In another embodiment, the portal site 104 connects end users 102 to a foundry or semiconductor manufacturers. The portal site may facilitate the search for a suitable foundry or semiconductor manufacturing facility, by providing a database of such, and by attempting to match up the end user 102 with the most suitable foundries or manufacturing facilities. The portal site 104 provides views into the compatibility of component suppliers 106 with one another and with the standards utilized by specific foundries or semiconductor manufacturers, thus allowing the end users 102 to select appropriate upstream component suppliers 106 early in the design process.

In another embodiment, the portal site 104 connects end users 102 looking for information on virtual circuit blocks or IP cores, or interested in purchasing such, with suppliers 106 offering virtual circuit blocks or IP cores. The portal site 104 may facilitate the locating and acquisition of suitable virtual circuit blocks or IP cores by, for example, providing a catalog of available IP cores, information regarding the IP cores, and access to mechanisms for protecting IP cores from unauthorized user or copying.

In another embodiment, the portal site 104 tracks the movements of the end users 102 through the portal site 104, in order to learn about the design preferences and design approaches of users individually and in the aggregate. Previous actions taken by the end user 102 are used in determining information presented to the end user 102 in a later visit to the portal site 104, thereby providing contextually-driven access. Also, actions taken by other similarly situated end users 102 working on analogous designs may be used in determining what information should be presented to the end user 102, or in what order such information should be presented.

In another embodiment, a plurality of the above features are combined at a single portal site 204 to provide comprehensive support for the circuit design and development process.

Figure 2:
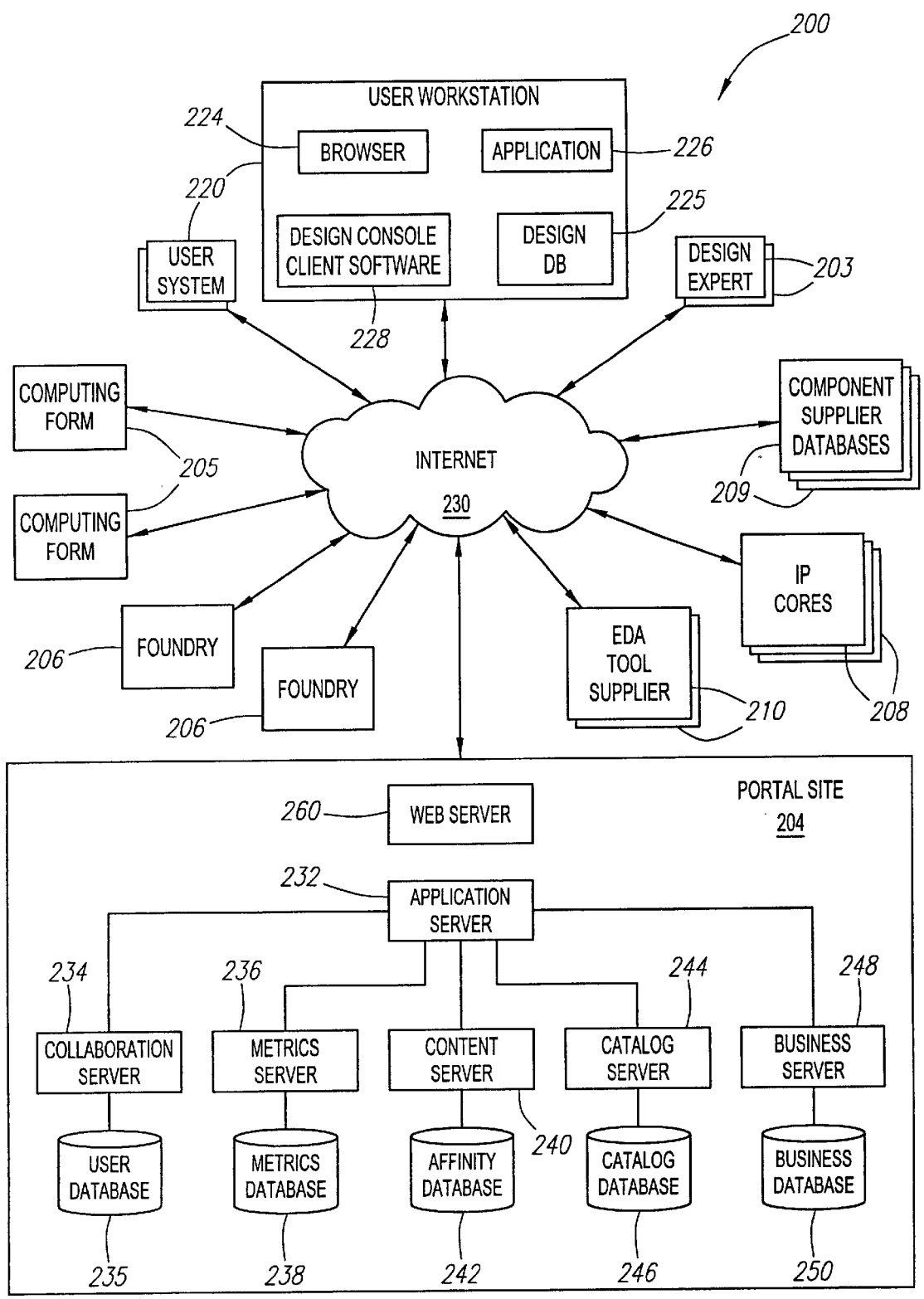
FIG. 2 is a more detailed diagram of a system for facilitating electronic design by connecting end users with suppliers of electrical design tools, services, information and/or other resources.

FIG. 2 is a more detailed diagram of a system 200 for facilitating electronic design by connecting end users with suppliers of electrical design tools, services, information and/or other resources. As illustrated in FIG. 2, a variety of users and resource providers are connected to a portal site 204 over a distributed electronic network such as the Internet 230, for the purpose of facilitating electronic design. In the system 200 illustrated in FIG. 2, user systems 220 connect over the Internet 230 to the portal site 204. While only a single user system 220 is shown in FIG. 2 for purposes of illustration, it will be understood that many user systems, on the order of hundreds or thousands, may so connect to the portal site 204 over the Internet 230 or other distributed electronic network. For the purposes of the following discussion, it will be assumed that the user systems are connected to the portal site 204 over the Internet 230, although it will be understood that other types of distributed electronic networks may also be utilized for such connection. Standard object data models, such as Corba™, BizTalk™, or DCOM™, for example, may be used to link a user system 220 to the portal site 204 over the Internet 230.

User systems 220 connected to the portal site 204 over the Internet 230 may comprise standalone computers or workstations, which may connect directly to the Internet 230, or may be part of a local area network (LAN) which comprises designated network hardware and/or software for connecting to the Internet 230, or may connect to the portal site 204 through some other means. A user system 220 preferably comprises a means for navigating the Internet 230 such as a web browser 224, which may comprise, for example, a standard commercially available product such as Microsoft's Internet Explorer™, Netscape's Communicator™, or Opera Software's Opera™. The user system 220 also preferably runs one or more supplier applications 226 in the form of computer programs or other software packages, such as, for example, E-Capture™, which is a commercial product available from Cadence Design Systems of San Jose, Calif. A "design console" interface 228 is also preferably provided as part of the user system 220. The design console interface 228 may comprise a standalone client application software program installed on and running on the user system 228. The design console interface 228 acts as an interface with the portal site 204, and is preferably optimized to interlink the functions and processes offered by the portal site 204 in a faster, more robust and more efficient manner than would otherwise be provided by a standard web browser. A universal data interface format or mark-up language, such as XML, is preferably used as a primary data interface between the various components of the system 200. The details of XML are well-known to those in the art of computer programming.

Turning now to the portal site 204 of the system, the portal site 204 acts as an aggregation point for many suppliers 106 (see FIG. 1) in potentially widely different domains. The portal site 204 preferably includes a web server 260 which interfaces with outside entities (such as user system 220) seeking access to the portal site 204, acting as an intermediary between those outside entities and the various applications available at the portal site 204. The portal site 204 also preferably includes an application server 232, which receives requests from outside entities passed through the web server 260 and responds thereto by accessing the databases and other resources included in or accessible through the portal site 204. The application server 232 also serves a command-and-control function within the portal site 204.

The application server 232 preferably accesses one or more databases containing information useful to design engineers, such databases including, for example, a user database 235, a metrics database 238, an affinity database 242, a catalog database 246, and a business database 250, the functions of which are described later herein. The user database 235 is accessed through a collaboration server 234, the metrics database 238 through a metrics server 236, the affinity database 242 through a context server 240, the catalog database 246 through a catalog server 244, and the business database 250 through a business server 248. Additional databases and servers may be included if desired. Also preferably connected to the portal site 204 over the Internet 230 are one or more component supplier databases 209, IP core databases 208, EDA tool suppliers 210, computing farms 205, foundries 206, and/or design experts 203, the role of which will be explained in more detail herein with reference to FIGS. 3 through 10. In a preferred embodiment, the specifics of each user's visit to the portal site 204 are recorded in the affinity database 242 when the user completes a session. The information recorded may include, for example, the nature and size of the design on which the user is working, the components selected by the user, and the navigation path through the various resources at the portal site 204, among other things.

One of more of the databases 235, 238, 242, 246 and 250 provided by the portal site 204 may be configured with a distributed architecture, with the portal site 204 accessing information from other sites through secure XML tunnels. In particular, the catalog database 246 may advantageously be configured with a distributed architecture, with the portal site 204 accessing catalog information from remote databases (such as 208 and 209) through secure XML tunnels. Caching may be used where the database architecture is distributed so as to improve access performance.

From a general standpoint, the collaboration server 234 provides collaborative services to both end users 102 and suppliers 106 (see FIG. 1). The collaboration server 234 preferably integrates and serves collaboration-type applications such as chat, calendar, e-mail, online seminars, online conferencing, application and desktop sharing. The collaboration server 234 also preferably provides infrastructure support for expert design assistance through a "virtual" desktop presence, which allows real-time interaction of experts and designers.

The metrics server 236 assists in collecting data on usage of the portal site 204 and supplier services. In one aspect, the metrics server 236 may comprise a high performance, high capacity data store for data measured at the portal site 204. Such data may include, for example, web traffic patterns, application usage, component usage (by monitoring electronic bills of materials, for example), and user rating feedback, among other things. The metrics server 236 preferably provides such information to a specialized portal data mining application.

The context server 240 preferably stores user profile data, which may be used for portal personalization, as well as "meta data" derived from analysis of the metrics data handled by the metrics server 236. The context server 240 may also store data on purchasing history that can be used to provide suppliers with information needed to support the users.

The catalog server 244 preferably provides "electronic catalog" services to the client side software resident at the user system 220. As noted, the catalog database 246 may be configured in a distributed architecture, and integrated through links and other resources by the catalog server 244 and/or catalog database 246. Supplier catalog integration is preferably accomplished by use of a universal data format model such as XML.

The business server 248 supports business transactions between users and suppliers, as further described herein.

In a preferred embodiment, the portal site 204 provides a variety of useful resources for design engineers. Access to such resources may be conveniently described with reference to FIGS. 3 through 10, each of which illustrates a process for accessing information or other design resources relating to a particular area of design, development or manufacture. The portal site 204 thus, in one aspect, may provide an integrated set of resources for design engineers.

Figure 3:
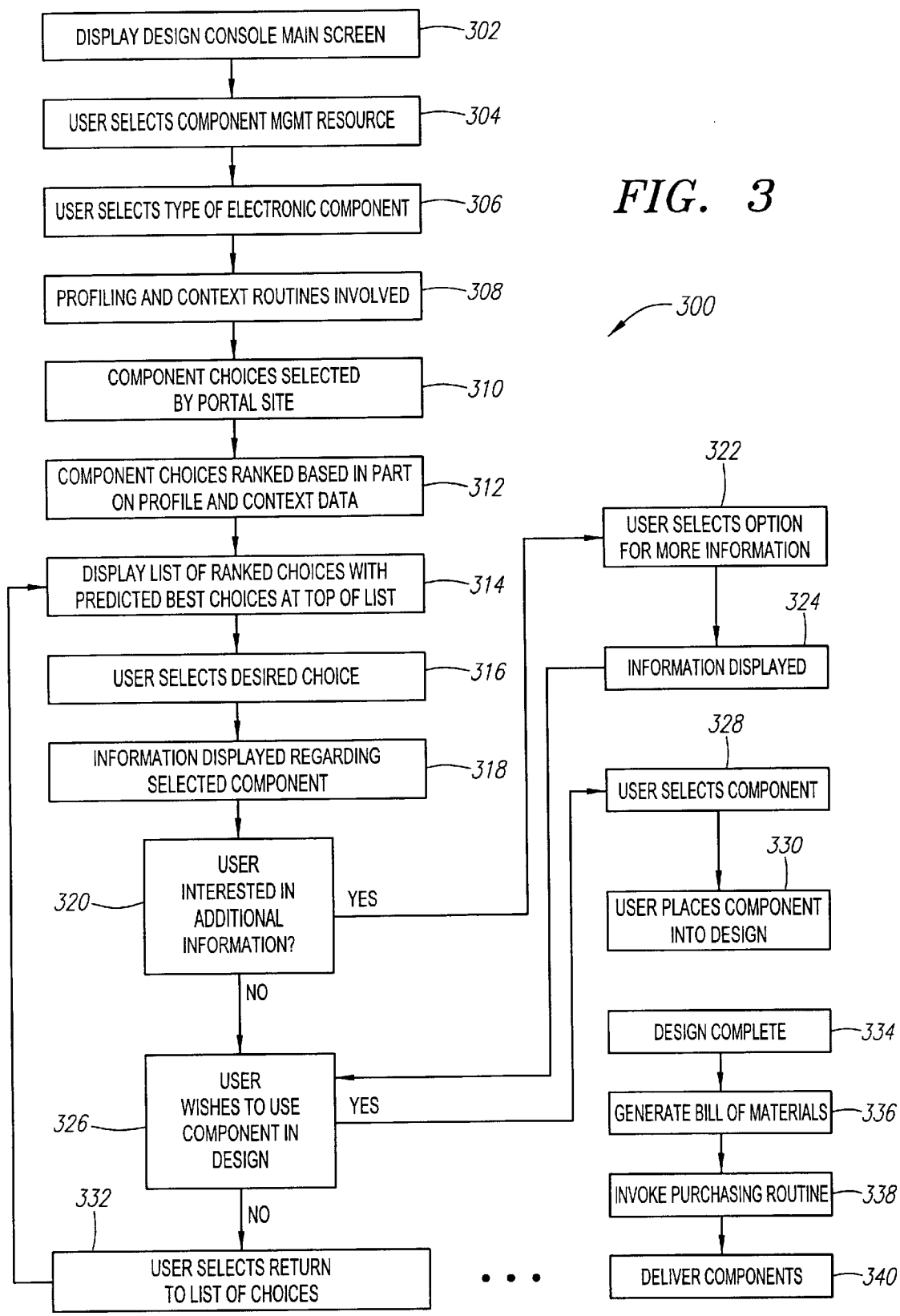
FIG. 3 is a flow chart illustrating a process for selecting and managing components in an electronic design, as may be used, for example, in connection with the system of FIG. 2.

FIG. 3 is a flow chart illustrating a preferred process 300 for selecting and managing components in an electronic design, as may be used, for example, in connection with the system of FIG. 2. In a first step 302 of the process 300 depicted in FIG. 3, a user at the user system 220 accesses the portal site 204 via the Internet 230 by entering the appropriate Unified Locator Resource (URL) or other applicable address, and in response the design console client software 228 displays a main design console menu screen on a computer screen at the user system 220. Throughout the described process 300, as well as the other processes described later herein, the display of data at the user system 220 is preferably accomplished by the transmission of appropriate commands over the Internet 230 from the portal site 204; that is, the portal site 204 transmits data through the Internet 230 to the user system 220 in a suitable format (e.g., hyper-text markup language (HTML) or a similar format) where it is then displayed. Means for formatting and transmitting information over the Internet 230 are well known to those skilled in the art of computer programming.

In a next step 304 of the process 300 illustrated in FIG. 3, the user at the user system 220 preferably selects an icon, link or other indicia for the component selection and management resource. For example, the user may click on an appropriate icon or link displayed in the design console main screen so as to select the component selection and management resource. Such icons or links are commonly employed in Internet application software, and techniques for placing the icons or links in a graphical user interfaces are well known to those skilled in the computing arts. Alternatively, the component selection and management resource may be accessed in a text-based environment by typing or entering an appropriate command. When the user selects the component selection and management resource, a message indicating the user's selection is transmitted over the Internet 230 to the portal site 204.

In response to the user selecting the component selection and management resource, a list of different types of parts available for use or purchase is then retrieved at the portal site 204 from the catalog database 246, and then transmitted to and displayed at the user system 220. The process of listing components is generally accomplished through the performance of steps 308, 310, 312 and 314. Listed components may include, for example, capacitors, field-programmable gates arrays (FPGAs), digital signal processors (DSPs), and any other components a design engineer may find useful. The components may either be discrete components for placement on a printed circuit board (PCB), or else may be components and/or virtual circuit blocks for placement within an integrated chip design. If more than one specific type of part is available for a component, then, in step 306, the user may select the component from the list provided in step 304, which preferably causes display of the available parts corresponding to the particular component, in an ordering as preferably described below with respect to step 310. For example, if the user selects a resistor as a component, the user system 220 may display a number of resistors having specified values, tolerances, and so forth. Alternatively, the user may be permitted to input search criteria to allow a search for all components meeting specified criteria, using, for example, ordinary database queries. For example, the user may search for all resistors having a resistance of 50 ohms and/or a tolerance of less than 5%. The user's search criteria may be provided to the portal site 204 over the Internet 230, resulting in an appropriate database search query being executed. The results of the search then may be transmitted back to the user system 220 from the portal site 204 over the Internet 230.

In a next step 308, user profiling and context routines are preferably invoked to assist in determining an ordering of display of the specific parts falling under the category of component selected by the user. The user profiling and context routines are common to many of the processes expected to be run on the portal site 204, and are described in more detail below with reference to FIG. 4. In one aspect, the profiling and context routines access and analyze historical data about the user's movement patterns in the portal site 204, and the movement of other users in the portal site 204 working on similar designs, so as to provide assistance to designers facing similar design issues.

The process 300 then proceeds with step 310, wherein the application server 232 retrieves a list of available parts from the catalog data base 246 via the catalog server 244 based on the user's component selection in step 306, the user's design information (if available), and profile and context data obtained from step 308. In a next step 312, the application server 232 ranks the available parts, preferably based upon the profile and context data obtained in step 308. The predicted best or most suitable choices for the user's design are placed at the top of the listing, based on the available information. Other choices of available parts for the component type preferably follow the best or most suitable parts. In one aspect, the user benefits from past design experience of both his or her own design as well as that of other designers who have been in the position of making similar design choices in previous designs. In a next step 314, the ranked list of available parts for the component type is transmitted from the portal site 204 to the user system 220 and displayed for the user's perusal. The ranked list of available parts may be displayed, for example, as a list of selectable strings, "hotlinks" or icons. The user reviews the ranked list of choices and, in step 316, selects one of the available choices by, e.g., highlighting the entry and hitting a keyboard key (such as the return key), or clicking on the entry with a computer mouse, or selecting a number corresponding to the ranking of the desired part, or by any other selection means, the specifics of which are not essential to the operation of the inventive concepts described herein. The user's selection is transmitted from the user system 220 to the portal site 204.

In a next step 318, additional information about the part chosen in step 316 is displayed to the user. Such information preferably constitutes relatively high level data, and is generally intended to allow the user to determine relatively quickly whether the user should include the selected part in the design, look for a different part from the ranked list, or gather further information about the selected part. Preferably, the user is presented with icons or other interface features for conveniently selecting whether to immediately incorporated the selected part in the user's design, backtrack to the ranked list and look for a different part, or else pull up additional information about the selected part. If the user is interested in additional information, the process 300 proceeds to step 322, wherein the user selects the appropriate interface feature (e.g., an icon or menu selection entry) to receive additional information about the selected part. The user's selection for more information is transmitted from the user system 220 to the portal site 204. In a next step 324, further information concerning the selected part is displayed. Such information may include detailed part information such as component data sheets, timing models (which may be in a language such as DTML or other timing description language), application notes, simulation models, signal integrity models (such as IBIS models), manufacturing information, or other information. A symbol and a footprint configuration for the selected part are also preferably provided, which may allow the user to make more informed decisions about placement of components in an overall design. Information displayed in step 324 may also include application notes regarding a component and its applications.

When the user is satisfied that the selected part is suitable for the user's design, then in step 328 the user selects the part by selecting the appropriate feature from the user interface. If, on the other hand, the user does not want to use the selected part, the process moves to step 332, wherein the user selects the appropriate feature from the user interface to return to the ranked list of choices displayed in step 314. If, on the other hand, the user decides to use the selected part in a design, the user then indicates such in step 328 by selecting the appropriate feature from the user interface. In a preferred embodiment, the process then continues with step 330, wherein the user places a graphical representation (e.g., symbol) of the selected part into the user's design by moving, copying or dragging the symbol of the selected part into the schematic program being used to develop the design. As part of the process of bringing the selected part into the schematic program, information concerning the selected part is preferably copied and stored at the user system 220 in the design database 225. Such information may include, for example, specifications concerning the selected part, as well as manufacturing information and a hyperlink to either the portal site 204 or a component supplier database 209 of the supplier or distributor of the selected part. Because of the link to a remote database, the parts selected from the portal site 204 and stored in the design database 225 at the user system 220 may be referred to as dynamic parts. Instead of storing the information concerning the selected part in the design database 225, it may also be stored, for example, in a separate database at the user's physical location or at some remote location.

The steps for selecting specific parts are then repeated for the other desired components of the user's design. Thus, the process 300 returns to step 306 for each remaining component for which the user desires to select a part using the resources of the portal site 204. Eventually, when the user finishes adding components to the design, the process 300 moves to step 334, at which the design is considered complete. At a later point, in preparation for manufacturing the design, the process 300 optionally proceeds to step 336, wherein a bill of materials is automatically generated from the components in the design. The user may initiate automatic generation of the bill of materials by making an appropriate menu selection using the design console client software 228, or an application 226 at the user system 220, or in some other manner.

In a next step 338, a purchasing routine is optionally invoked, during which the selected parts are purchased. Details of a preferred purchasing routine are described later herein. In a following step 340, the selected and purchased parts are shipped and delivered to a desired location, which may be the designer's physical location, the location of a semiconductor contract manufacturer (SCM), or any other manufacturing or usage site for the components. The component selection and management process 300 is preferably coordinated with other resources provided by the portal site 204 in order to increase the efficiency and effectiveness of the various and complementary circuit design, verification and manufacturing processes. For example, the component selection and management process 300 may be advantageously coordinated with an integrated circuit fabrication management process described herein, so as to facilitate the selection of parts that are easily obtained and assembled by a given foundry or manufacturer.

Further details relating to various aspects of a preferred component selection and management process are described in U.S. patent application Ser. No. 09/514,674 filed concurrently herewith, and hereby incorporated by reference as if set forth fully herein.

Figure 5:
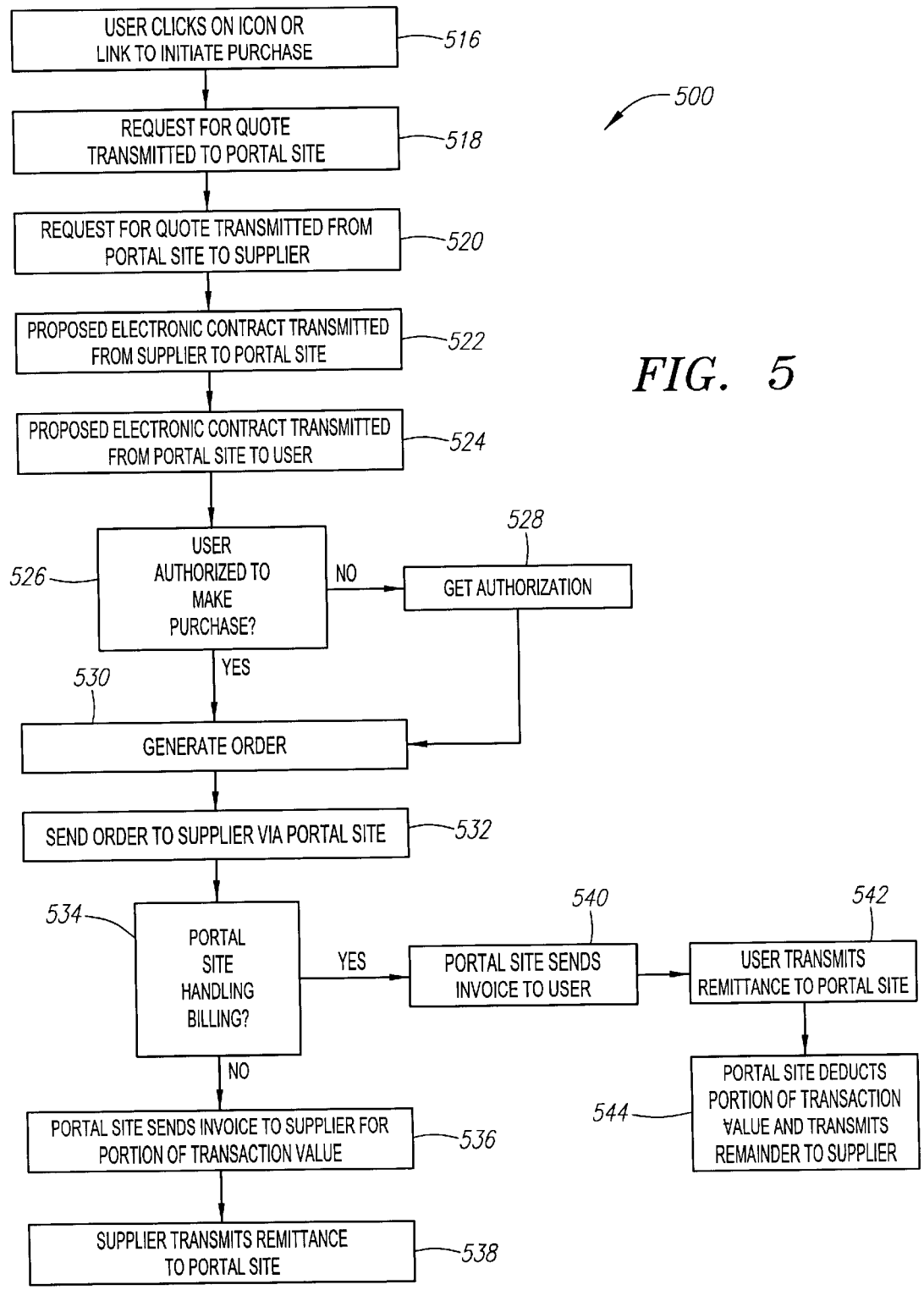
FIG. 5 is a flow chart illustrating a process for purchasing components by accessing a portal site such as shown in FIG. 2 over a distributed electronic network.

FIG. 5 is a flow chart illustrating a process 500 for purchasing components by accessing a portal site 204 such as shown in FIG. 2. The purchasing process 500 may be invoked directly by the user accessing the portal site 204 to purchase one or more items, or else may be automatically invoked in whole or in part in connection with a larger process, such as the component selection and management process 300 illustrated in FIG. 3. In a first step 516 of the purchasing process 500 illustrated in FIG. 5, the user selects a purchase option for a component or part which is displayed to the user on the user system 220. The user may be provided with a list of available parts in a manner similar to steps 306, 308, 310 and 312 illustrated in FIG. 3, or else the user may simply enter the desired part (by model number or designation) if already known, and the entered part information will be compared to parts information stored either at the portal site or available at supplier databases 209. The user may select a purchase option for a particular part by, for example, clicking on a purchase icon or a designated link with a computer mouse, or entering a purchase command on a computer keyboard. Prior to selecting a purchase option for a particular component, the portal site 204 may provide to the user information about the component availability and/or lead time, which data may be regularly stored and updated at the portal site, or else may be retrieved by the application server 232 on the fly, when needed from the appropriate supplier database 209.

User selection of the purchase option generates a request for a quote, which, in step 518, is transmitted to the portal site 204 from the user system 220 over the Internet 230. At the portal site 204, the application server 232 receives the request for a quote and invokes the business server 248, which accesses the business database 250 to generate a transaction record. The transaction record preferably contains information regarding the user's employer and the method of payment utilized by that employer, which may be retrieved from the user profile stored in the affinity database 242 or else may be independently stored in the business database 250. The transaction record generated in the early stage of a purchasing transaction may be updated as each step towards a final transaction is completed. In a next step 520, the application server 232 generates a request for a supplier quote and transmits this request via the Internet 230 to the appropriate supplier (which would typically be a site containing a supplier database 209). The request for a supplier quote may or may not include specifics regarding the user that is requesting the quote and the size of the business employing the user. In a preferred embodiment, such information is included for the purpose of, among other reasons, enabling the supplier to determine whether or not the purchaser qualifies for certain discounts as commonly offered in the industry, such as volume discounts, or preferred supplier or user discounts. The request for a supplier quote may be tagged with a transaction identifier to facilitate match-up of a responsive price quote from the supplier.

In a next step 522, the supplier preferably transmits a proposed electronic contract, including a price quote, to the portal site 204 over the Internet 230. The proposed electronic contract preferably is identified at least in part by the transaction identifier transmitted as part of the request for a supplier price quote. In step 524, the proposed electronic contract is forwarded from the portal site 204 to the user system 220. In a preferred embodiment, the supplier quote is considered by the user and supplier as an offer for sale, and acceptance of this offer by the user creates a binding contract between the user and the supplier, provided that the user has authority to enter into such a contract.

In a next step 526, an authentication procedure is performed to ensure that the user is authorized to make the desired purchase. In one embodiment, for example, the design console client software 228 initiates a procedure to determine whether or not the user is authorized to make a purchase. Such factors will vary from user to user and company to company, and may depend upon such factors as the monetary amount of the purchase to be made, the seniority of the individual making the request, and other such factors. The design console client software 228 preferably stores or has access to data regarding the authorization level of the user. The authorization data may, for example, be stored in a separate database (local or remote) operated by the user's employer, through which transactions requiring payment must pass for authorization. Alternatively, the authorization function may be provided at the application server 232, as the location where the authorization decision is made is not critical to the functionality of the embodiments described herein. As a result of the authentication procedure, the design console client software 228 may not allow the user to purchase the selected part, or it may allow the user to purchase parts up to a certain total dollar value.

If the user is not authorized to make the purchase, then the user obtains authorization, as indicated by step 528. This authorization step 528 may take a wide variety of forms, including electronic authorization, paper authorization, formal approval processes and the like. If the user does not obtain authorization, the process 500 may terminate at step 528.

In step 530, once the user is authorized to make the purchase, then an order is generated to the supplier, and a contract is created between the user and the supplier for the purchase and delivery of desired products or services. The order is then transmitted to the supplier via the portal site 204, as indicated in step 532.

The portal site 204 may have varying levels of involvement in the business transaction. In step 534, for example, a determination is made as to whether or not the portal site 204 is handling the billing for the transaction. If not, then in step 536, the application server 232 may cause an invoice for a portion of the cost of the transaction that passed through the portal site 204 (i.e., a commission for bringing the user and supplier together) to be generated and transmitted from the portal site 204 over the Internet 230 to the supplier. The amount of the commission as reflected on the invoice may be generated based on a percentage of the overall transaction value, on a per transaction basis, or on another basis worked out on mutually agreeable terms between the particular supplier and the operator of the portal site 204. In a next step 538, the supplier then sends the invoiced amount to the portal site 204 as compensation. In a preferred embodiment, invoicing and payment are both electronic in nature; however, one or both of these may be in paper form. For convenience, the supplier may maintain an account at the portal site 204, which gets automatically debited by the amount which would otherwise be invoiced.

Returning to step 534, if the portal site 204 is handling billing, then the process 500 proceeds to step 540, wherein the application server 232 generates an invoice and transmits it from portal site 204 to the user over the Internet 230. In a next step 542, the user then transmits remittance for that invoice to the portal site 204, which may be done electronically or through paper. Alternatively, the user may maintain an account with the portal site 204, which may be electronically debited. Next, in step 544, the portal site 204 optionally deducts a portion of the remitted amount as compensation for acting as an intermediary, and transmits the remainder of the remittance (electronically or in paper form) to the supplier. At that point, the purchasing process 500 is complete.

Figure 4:
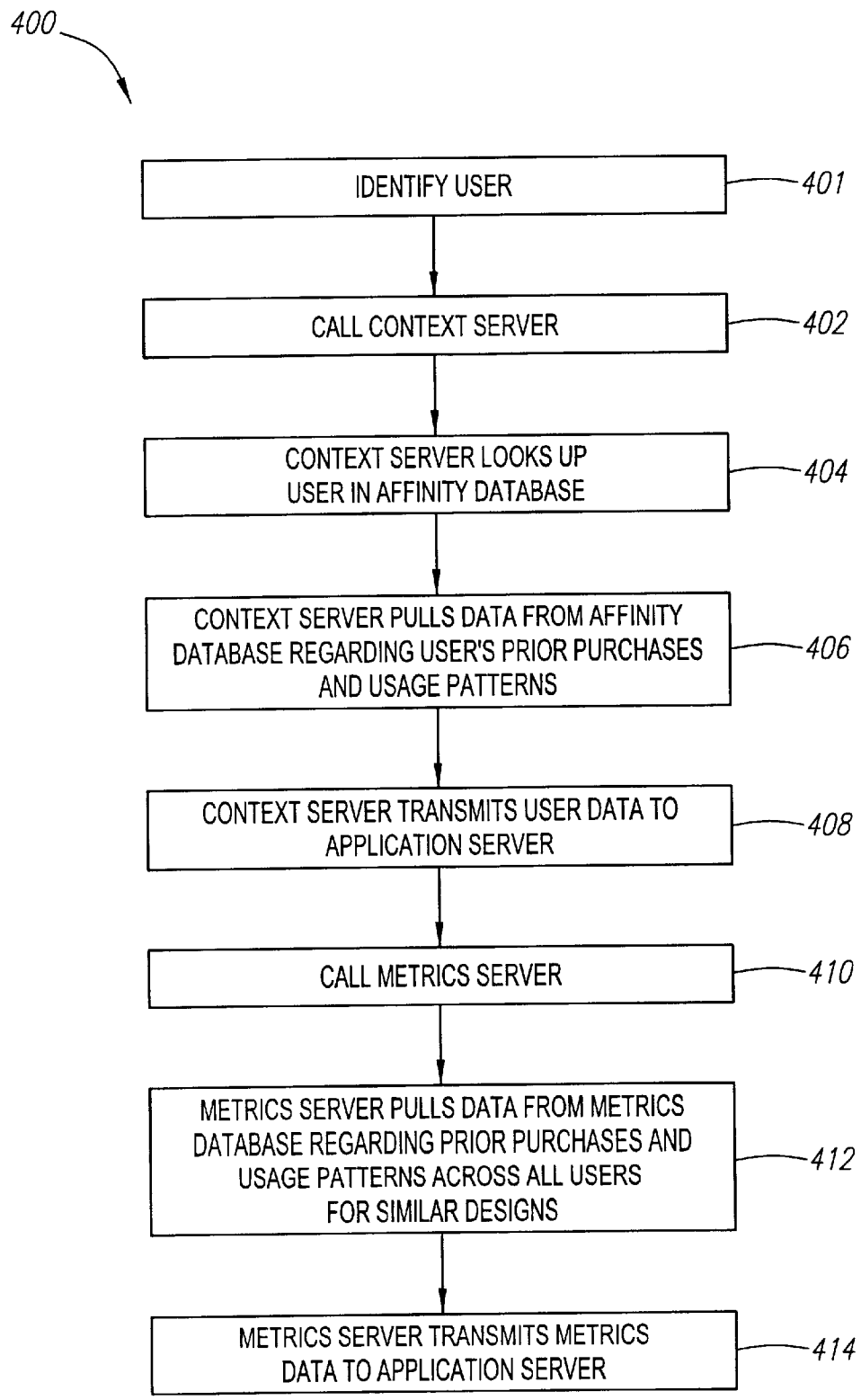
FIG. 4 is a flow chart illustrating a process for user profiling and design assistance, as may be used, for example, in connection with the system of FIG. 2.

In addition to component selection and management and component purchasing, another feature preferably offered at the portal site 204 is a user profiling and automated design assistance. FIG. 4 is a flow chart illustrating a preferred process 400 for user profiling and design assistance, as may be used, for example, in connection with the system of FIG. 2. As illustrated in FIG. 4, at the start of the user profiling and automated design process 400, a user identification step 401 occurs when the user accesses the portal site 204. Such identification may be accomplished by recognition of a username/password combination, or a "cookie" left on the user system 220 (on, e.g., the user's hard drive), or other means. Typically, a user of the portal site 204 would be required to enter certain information at some point before accessing certain features of the portal site 204. This information may include, for example, a user name, company affiliation, method of payment, type of engineering performed, and anticipated or actual size of the design in gates. This information is placed in the user's profile and stored, for example in the affinity database 242. Such information may be updated periodically, as necessary, by the user. The user profile is accessed, as noted above, when the user first enters the portal site 204. If the user does not have a profile when entering the portal site 204, the user may be prompted to enter data so as to generate a user profile.

In a preferred embodiment, some portion of the user profile is automatically generated by the portal site 204 based on the user's actions over time while visiting the portal site 204. For example, the user profile data may include such information as the user's prior component purchases using the portal site 204, or prior usage or navigation patterns through the resources of the portal site 204. Such usage patterns may include, for example, the number of times the user has visited or utilized various features of the portal site 204, the number of times certain information items or types have been accessed and in what order, and other data which may be apparent from analysis of the user's habits through various data mining techniques as known in the art. Preferably, all searches, queries, results and parts utilized by a.user are stored, in combination with other information, if desired, as part of the user profile data in the affinity database 242 (and/or the metrics database 238).

In a next step 402, the application server 232 invokes the context server 240 to retrieve the user profile information. In step 404, the context server 240 locates the user profile in the affinity database 242 (see FIG. 2). In a next step 406, the context server 240 pulls user profile data from the affinity database 242, such as, for example, the user's name, the user's employer or affiliation, the user's prior purchases, and the user's prior site navigation and usage patterns. In a next step 408, the context server 240 delivers this data to the application server 232.

After retrieving the user profile information and providing it to the application server 232, in the following steps of the process 400, metrics information is retrieved aggregated from the habits and behavior of other design engineers using the portal site 204. Thus, in step 410, the application server 232 invokes the metrics server 236. In a next step 412, the metrics server 236 pulls data from the metrics database 238 regarding the habits and behavior of users whose designs are similar in scale and/or type. For this reason, it is preferred that the user profile for each user include some data about the scale and/or type of each design on which the user is working. More specifically, metrics data may include prior component purchases and prior site navigation or usage patterns across a plurality of users whose designs have similar design characteristics. In a next step 414, the metrics server 236 delivers the metrics data retrieved from the metrics database 238 to the application server 232. The application server 232 thus has available data for the individual user, in addition to users in the aggregate, which may be furnished to the other resources, features or applications of the portal site 204 to facilitate the design process.

An advantage provided by the process 400 described above is that it is useful from the standpoint of design knowledge capture. The ability to track the movements of individual engineers through the portal site 204, then aggregate those movements together, allows for capture and analysis of some aspects of the engineering design process that may have been previously unappreciated. Such information may be valuable in both academic and industrial contexts.

In one embodiment, the application server 232 comprises campaigning software for targeting messages or banners to engineers and other users of the portal site 204 based on their past historical usage and the usage of those similarly situated. An example of campaigning software that may be used is SiteServer™ which is a commercial product available from Microsoft. Preferably, the campaigning software of the application server 232 provides the capability to assign different targeted messages or banners to different campaigns. A campaign message or banner database may be included at the portal site 204 for use in conjunction with the campaigning software.

Figure 6:
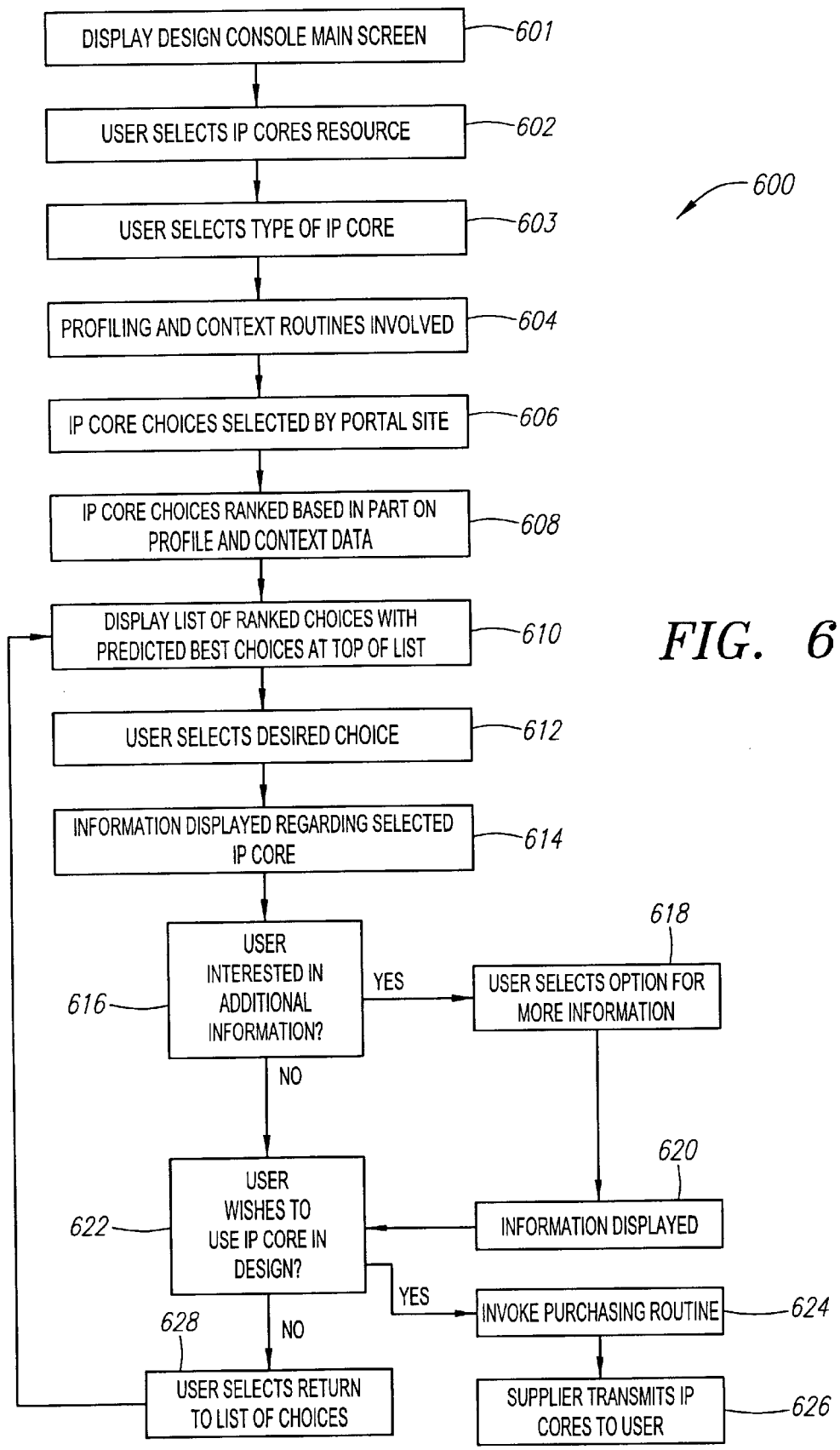
FIG. 6 is a flow chart illustrating a process for providing information and services regarding virtual component blocks or IP cores, as may be used, for example, in connection with the system of FIG. 2.

FIG. 6 is a flow chart illustrating a process 600 for providing information and services regarding virtual component blocks or IP cores, as may be used, for example, in connection with the system of FIG. 2. Many of the steps in the process 600 for providing information and services regarding virtual component blocks or IP cores are similar to the steps performed in connection with the component information and management process 300 described earlier herein with respect to FIG. 3. For the purposes of convenience, the terminology "IP cores" will be used in the explanation of the process of FIG. 6, but such terminology is not intended to be limiting.

In a first step 601 of the process 600 depicted in FIG. 6, a user at the user system 220 accesses the portal site 204 via the Internet 230 in a manner similar to the described with respect to FIG. 3 (i.e., by entering the appropriate Unified Locator Resource (URL) or other applicable address), and in response the design console client software 228 displays a main design console menu screen on a computer screen at the user system 220. In a next step 602, the user at the user system 220 preferably selects an icon, link or other indicia for the IP core selection and management resource. For example, the user may click on an appropriate icon or link displayed in the design console main screen so as to select the IP core selection and management resource, or by typing or entering an appropriate command. The user's selection is then transmitted over the Internet 230 to the portal site 204.

In response to the user selecting the IP core selection and management resource, a list of different types of IP cores available for use or purchase is then retrieved at the portal site 204 from the catalog database 246, and then transmitted to and displayed at the user system 220. Listed components may include, for example, Viterbi decoders, digital signal processors, or any other IP cores a design engineer may find useful. If more than one specific type of IP core is available for a component, then, in step 603, the user may select the IP core type from the list provided in step 602, which preferably causes display of the available IP cores from different manufacturers or suppliers, in a ranked ordering similar to that described with respect to FIG. 3. For example, if the user selects a digital signal processor as a component, the user system 220 may display a number of digital signal processors having specified sample rates, bandwidths, resolution, and so on. Alternatively, the user may be permitted to input search criteria to allow a search for all components meeting specified criteria, which may be implemented, for example, using ordinary database queries. For example, the user may search for all digital signal processors having a certain sample rate and/or a price of under a specified monetary amount.

In a next step 604, user profiling and context routines are preferably invoked to assist in determining an ordering of display of the specific IP cores falling under the category of IP core type selected by the user. The user profiling and context routines are generally described in more detail herein with reference to FIG. 4.

The process 600 then proceeds with step 606, wherein the application server 232 retrieves a list of available IP cores from the catalog data base 246 via the catalog server 244 based on the user's component selection in step 603, the user's design information (if available), and profile and context data obtained from step 604. In a next step 608, the application server 232 ranks the available IP cores, preferably based upon the profile and context data obtained in step 604. The predicted best or most suitable choices for the user's design are placed at the top of the listing, based on the available information. Other choices of available IP cores for the selected IP core type preferably follow the best or most suitable IP cores. In one aspect, the user benefits from past design experience of both his or her own design as well as that of other designers who have been in the position of making similar design choices in previous designs. In a next step 610, the ranked list of available IP cores for the selected IP core type is transmitted from the portal site 204 to the user system 220 and displayed for the user's perusal. The ranked list of available IP cores may be displayed, for example, as a list of selectable strings, "hotlinks" or icons. The user reviews the ranked list of choices and, in step 612, selects one of the available choices by, e.g., highlighting the entry and hitting a keyboard key (such as the return key), or clicking on the entry with a computer mouse, or selecting a number corresponding to the ranking of the desired IP core, or by any other selection means, the specifics of which are not essential to the operation of the inventive concepts described herein. The user's selection is transmitted from the user system 220 to the portal site 204.

In a next step 614, additional information about the IP core chosen in step 612 is displayed to the user. Such information preferably constitutes relatively high level data, and is generally intended to allow the user to determine relatively quickly whether the user should include the selected IP core in the design, look for a different IP core from the ranked list, or gather further information about the selected IP core. Preferably, the user is presented with icons or other interface features for conveniently selecting whether to immediately incorporated the selected IP core in the user's design, backtrack to the ranked list and look for a different IP core, or else pull up additional information about the selected IP core. If the user is interested in additional information, the process 600 proceeds to step 618, wherein the user selects the appropriate interface feature (e.g., an icon or menu selection entry) to receive additional information about the selected IP core. The user's selection for more information is transmitted from the user system 220 to the portal site 204. In a next step 620, the further information concerning the selected IP core is displayed. Such information may include detailed IP core information such as, for example, IP core data sheets. Preferably, information regarding IP packaging technology and service providers for packaging technology is also provided, as is information regarding the quality or the validation of the selected IP core. In a preferred embodiment, interface data regarding each IP core is standardized in a common data format to allow designers to quickly and easily choose between different IP cores which will be easily interchangeable in an end users design. A hotlink to an IP knowledge database is preferably provided whereby the user can access information about IP usage such as bug tracking, IP authoring guidelines, application notes and so forth. A hotlink may also be provided to a posting board or other forum by which users may directly exchange information with each other regarding IP cores. A symbol and a footprint configuration for the selected IP core are also preferably provided, which may allow the user to make more informed decisions about placement of IP cores and other components in an overall design.

When the user is satisfied that the selected IP core is suitable for the user's design, then in step 622 the user selects the IP core by selecting the appropriate feature from the user interface. If, on the other hand, the user does not want to use the selected IP core, the process moves to step 628, wherein the user selects the appropriate feature from the user interface to return to the ranked list of choices displayed in step 610. If, on the other hand, the user decides to use the selected IP core in a design, the user then indicates such in step 622 by selecting the appropriate feature from the user interface. In a preferred embodiment, the process permits the user to place a graphical representation (e.g., symbol) of the selected IP core into the user's design by moving, copying or dragging the symbol of the selected IP core into the schematic program being used to develop the design. As part of the process of bringing the selected IP core into the schematic program, information concerning the selected IP core is preferably copied and stored at the user system 220 in the design database 225. Such information may include, for example, specifications concerning the selected IP core, as well as manufacturing information and a hyperlink to either the portal site 204 or a component supplier database 209 of the supplier or distributor of the selected IP core.

In a next step 624, a purchasing routine is preferably invoked, during which the selected IP core is purchased. Details of a preferred purchasing routine are described herein with respect to FIG. 5. In a following step 626, the selected and purchased IP core is delivered to the user, preferably in electronic format over the Internet 230. As a part of step 626, the portal site 204 preferably performs a protection function where the IP core is protected from piracy or unauthorized use by embedding each IP core transmitted via the portal site with a digital watermark. One type of digital watermarking technique that may be used is disclose, for example, in copending U.S. patent application Ser. No. 09/514,695 filed concurrently herewith, and hereby incorporated by reference as if set forth fully herein. Alternatively, a digital watermark may simply comprise an embedded code (such as an encoded/encrypted identifier or set of identifiers) physically included as part of the IP core software.

The steps for selecting specific IP cores are then repeated, if desired, for the other IP cores incorporated into the user's design. Thus, the process 600 returns to step 603 for each remaining IP core for which the user desires to select using the resources of the portal site 204. Eventually, when the user finishes adding IP cores to the design, the process 600 returns to the general design console menu.

Use of the process 600 illustrated in FIG. 6 is expected to benefit both suppliers and users. For example, the use of the IP cores selection and management process 600 facilitates the exchange of data regarding the quality and features of IP cores, which is beneficial to suppliers who are able to demonstrate such quality and features to end users, and to users who have greater assurance about the quality and functionality of a given IP core. The IP cores selection and management process 600 also provides for protection of the IP cores, which can be important to facilitating the entry of suppliers into the IP marketplace and to protect their intellectual property rights in IP cores they have developed. Additionally, the IP core selection and management process 600 may advantageously reduce overhead for IP core sale and licensing transactions, because such transactions occur between a designer and a supplier via a portal site 204 without the need for intervention by other personnel from sales, marketing or legal departments.

Figure 7:
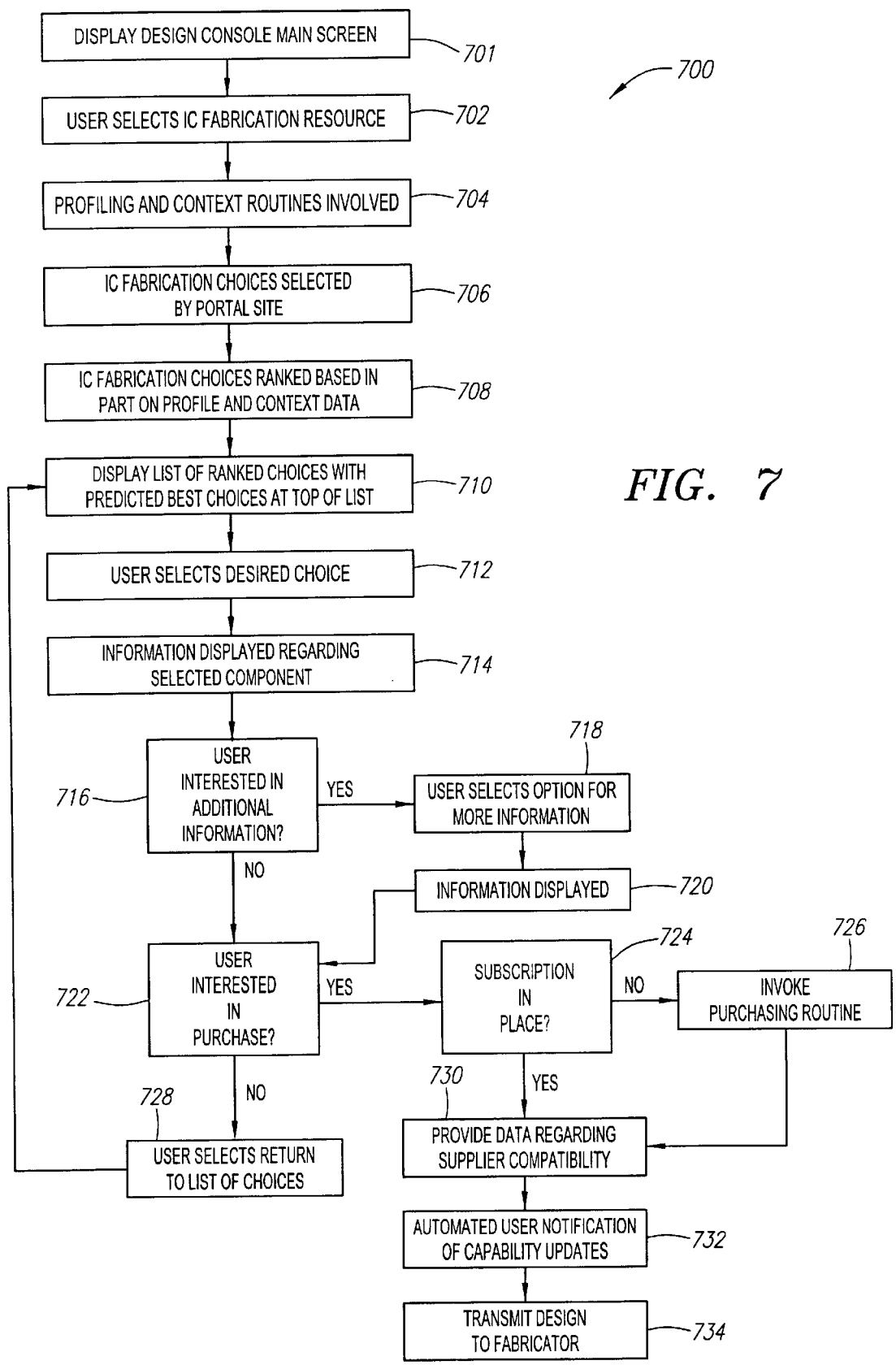
FIG. 7 is a flow chart illustrating a process for providing information and services regarding integrated circuit fabrication, as may be used, for example, in connection with the system of FIG. 2.

FIG. 7 is a flow chart illustrating a process 700 for providing information and services regarding integrated circuit (IC) fabrication, as may be used, for example, in connection with the system of FIG. 2. In a first step 701 of the IC fabrication process 700, as with the processes described with respect to FIGS. 3 and 6, for example, a user at the user system 220 accesses the portal site 204 via the Internet 230 in a manner similar to the described with respect to FIG. 3 (i.e., by entering the appropriate Unified Locator Resource (URL) or other applicable address), and in response the design console client software 228 displays a main design console menu screen on a computer screen at the user system 220. In a next step 702, the user at the user system 220 preferably selects an icon, link or other indicia for the IC fabrication resource. For example, the user may click on an appropriate icon or link displayed in the design console main screen so as to select the IC fabrication resource, or by typing or entering an appropriate command. The user's selection is then transmitted over the Internet 230 to the portal site 204.

After the user selects the IC fabrication resource, in a next step 704, user profiling and context routines are preferably invoked to assist the user by determining an ordering of display of the specific IC fabrication options. The user profiling and context routines are generally described in more detail herein with reference to FIG. 4. The process 700 then proceeds with step 706, wherein the application server 232 selects appropriate IC fabrication options from the catalog data base 246 via the catalog server 244 for the user based, for example, on the user's specific design and the user's profile and context data obtained from step 704. Such IC fabrication options may include, for example, specific IC fabrication facilities to which the user may send the design for fabrication. In a next step 708, the application server 232 ranks the available IC fabrication options, with the predicted best or most suitable choices for the user's design placed at the top of the listing, based on the available information. Other choices of available IC fabrication options preferably follow the best or most suitable IC fabrication options. In one aspect, the user benefits from past design experience of both his or her own design as well as that of other designers who have been in the position of making similar fabrication choices in previous designs.

In a next step 710, the ranked list of available IC fabrication options is transmitted from the portal site 204 to the user system 220 and displayed for the user's perusal. The ranked list of available IC fabrication options may be displayed, for example, as a list of selectable strings, "hotlinks" or icons. The user reviews the ranked list of choices and, in step 712, selects one of the available choices by, e.g., highlighting the entry and hitting a keyboard key (such as the return key), or clicking on the entry with a computer mouse, or selecting a number corresponding to the ranking of the desired option, or by any other selection means, the specifics of which are not essential to the operation of the inventive concepts described herein. The user's selection is transmitted from the user system 220 to the portal site 204.

In a next step 714, information about the IC fabrication option chosen in step 712 is displayed. Such information preferably constitutes relatively high level data, and is generally intended to allow the user to determine relatively quickly whether the user should find out more information about the IC fabricator, purchase IC fabrication services, or obtain information about a different IC fabricator. If the user is interested in additional information, the process 700 proceeds to step 718, wherein the user selects the appropriate interface feature (e.g., an icon or menu selection entry) to receive additional information about the selected IC fabricator. The user's selection for more information is transmitted from the user system 220 to the portal site 204. In a next step 720, the further information concerning the selected IC fabricator is displayed. Such information may include detailed information such as, for example, compatibility data for the IC fabricator, and semiconductor technology options available from the IC fabricator. The information displayed in step 724 may be stored locally at the portal site 204, or optionally linked over the Internet 230 or otherwise to the IC fabricator's web site or network. In addition to IC fabrication services, the IC fabricator may also offer specialized fabrication information on a subscription basis.

If the user is interested in purchasing IC fabrication services or other products or services (e.g., specialized information) from the displayed supplier, then the process 700 proceeds to step 724, wherein the application server 232 accesses the affinity database 242 (or another suitable database where such information may be maintained) to determine whether there is a subscription in place for the specific user. If not, then, in a next step 726, a purchasing routine (such as that shown in FIG. 5) is invoked by which such a subscription may be purchased by the user. If the user has a subscription, or purchases one, the process proceeds to step 730, wherein data regarding the selected IC fabrication supplier is transmitted to the user system 220 over the Internet 230. Such data preferably includes detailed information regarding the current state of compatibility of the selected IC fabricator with component suppliers (including IP core suppliers). The catalog server 244, in one aspect, aggregates supplier information into a taxonomy of information which can be viewed contextually from the portal site 204. Active compatibility links provide an automated means for communicating updates and changes to relevant suppliers and designers. The IC fabrication resource thereby allows end users to rapidly evaluate supply chain alternatives, and the viability and reliability of supply chain choices. Suppliers are additionally able to effectively communicate preferred supply chain partners to maximize compliance without having full manufacturing inputs.

The portal site 204 preferably provides an interface or an automated mechanism for suppliers to enter and update compatibility information, as well as to expedite actions to address compatibility issues relating to relevant updates elsewhere in the supplier chain. After step 728, optional step 730 may follow in which automated user notifications regarding compatibility updates may be selected. Such automated notifications may be subject to an additional fee, if desired.

In a next step 734, the completed design is delivered from the portal site 204 to the IC fabricator for manufacturing.

This delivery is preferably performed by electronic transmission over the Internet 230 to the website of the IC fabricator. However, the design may be transmitted on paper, or by a computer medium (e.g., disk), or by any other suitable means. An advantage of accessing the information provided by the IC fabrication resource prior to sending the design out for manufacturing, the user is expected to minimize potential incompatibility or manufacturability problems.

Figure 8:
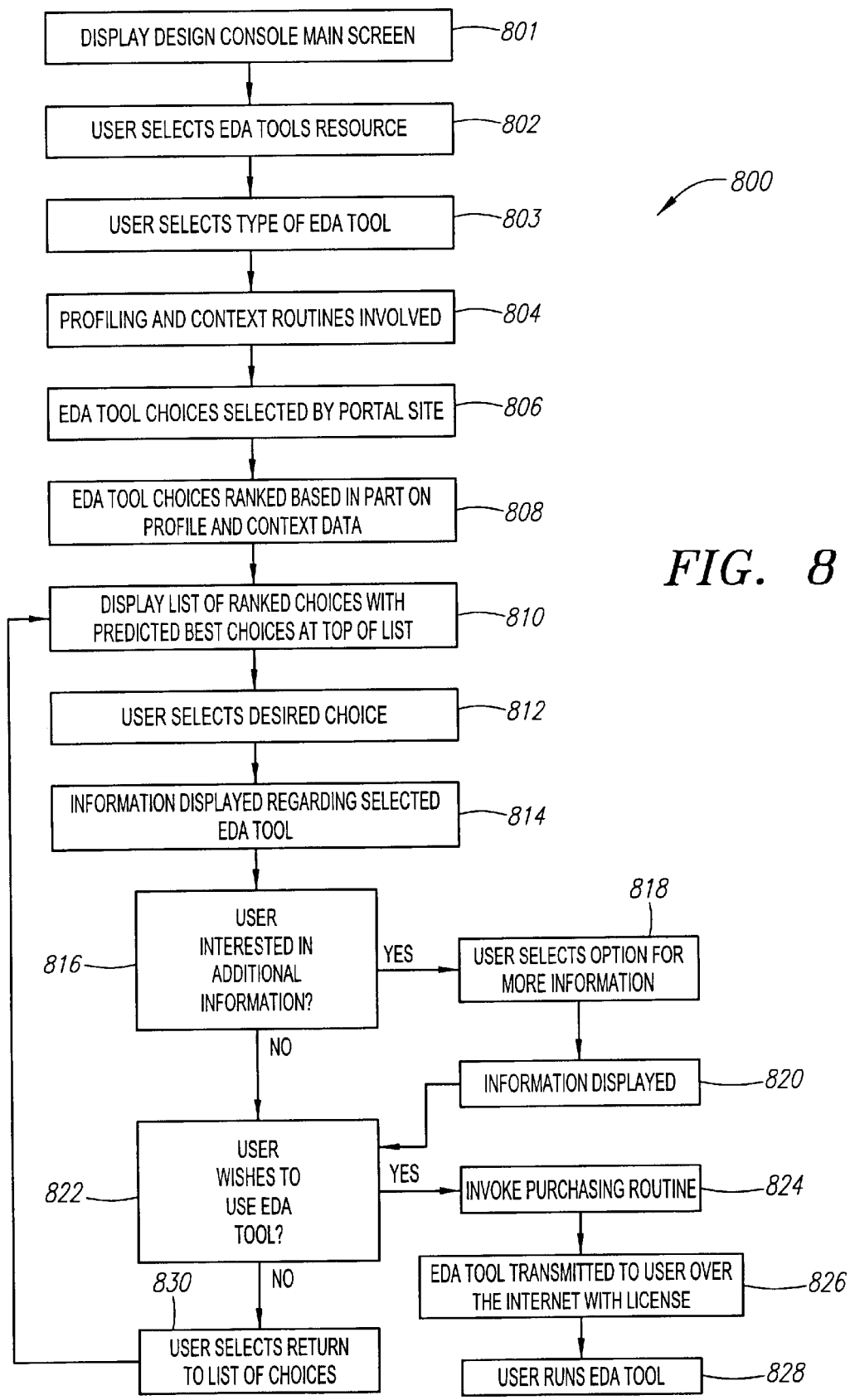
FIG. 8 is a flow chart illustrating a process for providing information and services regarding electronic design automation, as may be used, for example, in connection with the system of FIG. 2.

FIG. 8 is a flow chart illustrating a process 800 for providing information, services and/or tools for electronic design automation (EDA), as may be used, for example, in connection with the system of FIG. 2. Electronic design automation is an established field in electrical engineering and computer arts, and generally refers to automated tools for assisting with integrated circuit design and verification of design integrity and operation. Examples of electronic design automation tools include schematic capture programs, simulators, emulators, and logic synthesizers, to name a few.

In a first step 801 of the process 800 illustrated in FIG. 8, as with the processes previously described (e.g., with respect to FIGS. 3, 6 and 8), a user at the user system 220 preferably accesses the portal site 204 via the Internet 230 by entering the appropriate Unified Locator Resource (URL) or other applicable address. In response, the design console client software 228 displays a main design console menu screen on a computer screen at the user system 220. In a next step 802, the user at the user system 220 preferably selects an icon, link or other indicia for the EDA resource. For example, the user may click on an appropriate icon or link displayed in the design console main screen so as to select the EDA resource, or by typing or entering an appropriate command. The user's selection is then transmitted over the Internet 230 to the portal site 204.

After the user selects the EDA resource, a list of different types of EDA tools or services available for use or purchase is then retrieved at the portal site 204 from the catalog database 246, and transmitted to and displayed at the user system 220. Listed EDA tools or services may include, for example, schematic capture programs, simulators, emulators, logic synthesis tools, or any other EDA tools a design engineer may find useful. In step 803, the user selects the desired EDA tool or service from the list provided, which preferably causes display of the available EDA tools or services of the desired type from different manufacturers or suppliers, in a ranked ordering similar to that described with respect to FIGS. 3 and 6. To provide such a ranked ordering, in a next step 804, user profiling and context routines are preferably invoked. The user profiling and context routines are generally described in more detail herein with reference to FIG. 4. The process 800 then proceeds with step 806, wherein the application server 232 selects appropriate EDA tool or service options for the user from the catalog data base 246 via the catalog server 244 based, for example, on the user's specific design, the design status (e.g., level of completion), the user's profile data, and the context data obtained from step 804. In a next step 808, the application server 232 ranks the available EDA tool and service options, with the predicted best or most suitable choices for the user's design placed at the top of the listing, based on the available information. Other choices of available EDA tool and service options preferably follow the best or most suitable options. In one aspect, the user benefits from past design experience of both his or her own design as well as that of other designers who have been in the position of making similar EDA tool or service choices in previous designs.

In a next step 810, the ranked list of available EDA tool or service options is transmitted from the portal site 204 to the user system 220 and displayed for the user's perusal. The ranked list of available EDA tool or service options may be displayed, for example, as a list of selectable strings, "hotlinks" or icons. The user reviews the ranked list of choices and, in step 812, selects one of the available choices by, e.g., highlighting the entry and hitting a keyboard key (such as the return key), clicking on the entry with a computer mouse, selecting a number corresponding to the ranking of the desired option, or by any other selection means, the specifics of which are not essential to the operation of the inventive concepts described herein. The user's selection is transmitted from the user system 220 to the portal site 204.

In a next step 814, information about the EDA tool or service option chosen in step 812 is displayed. Such information preferably constitutes relatively high level data, and is generally intended to allow the user to determine relatively quickly whether the user should find out more information about the EDA tool or service, purchase or lease the EDA tool or service, or obtain information about a different EDA tool or service. If the user is interested in additional information, the process 800 proceeds to step 818, wherein the user selects the appropriate interface feature (e.g., an icon or menu selection entry) to receive additional information about the selected EDA tool or service. The user's selection for more information is transmitted from the user system 220 to the portal site 204. In a next step 820, the further information concerning the selected EDA tool or service is displayed. Such information may include detailed information such as, for example, information regarding the capabilities of that specific EDA tool, such as limits to the number of gates in the design to be verified, processing speed, and other information of use to the user. This information may also include such items as on-line seminars, product demonstrations and virtual benchmarks and evaluations of the EDA tools. Such information is particularly valuable in the context of EDA tools, due to the large number of such tools available and their complexity.

If the user is not interested in the selected EDA tool or service, then the user may back out and return to step 810, whereupon the ranked list is again displayed for the user's perusal. If, on the other hand, the user is interested in purchasing or leasing the selected EDA tool or service, then the process 800 proceeds to step 824, wherein a purchasing routine (such as that shown in FIG. 5) is invoked. In a next step 826, the selected EDA tool or service is delivered to the user. Typically, the EDA tool is in the form a software package, and is preferably electronically transmitted, along with a license for a specified term, to the user system 220 via the Internet 230. The license may be on a per use, per hour or per day basis, or for a duration mutually agreeable to the manufacturer and the end user. In a next step 828, the user operates the EDA tool or otherwise utilizes the purchased EDA services.

Alternatively, the EDA tool may be run at a remote site that is leased on a temporary basis from a supplier of large distributed computing resources, as disclosed in greater detail below in connection with the process illustrated in FIG. 9.

Where the EDA tool includes a hardware component, such as in the case of hardware emulation, then in step 826, rather than receiving a software package over the Internet 230, the user preferably delivers the design to the emulation tool provider. For example, the user may transmit his or her design to the emulation tool provider over the Internet 230.

The design console client software 228 may be adapted to facilitate use of one or more EDA tools available to the user system 220 (either downloaded from the portal site 204 or otherwise installed at or available to the user system 220). The design console client software 228 preferably allows the user to launch all of the available EDA tools available at the user system 220. The design console client software 228 also preferably comprises an asset manager (particularly in a local network or intranet environment) which allows the user to find out the availability of EDA tools, the availability of CPU time and disk space, and which user is utilizing these resources. In a preferred embodiment, the design console client software 228 is adapted to allow the user to put together a series of scripts so as to program the usage of one or more EDA tools, which may be accessed, as needed, via the portal site 204. For example, a user might program a script for a design compiling process using a compiler tool, followed by a simulation run using a simulator tool, followed by additional EDA processes, if desired. The scripted processes may be designated to run on a computing time availability basis, such that the processes are invoked only when the necessary computing resources become available.

Support for EDA tools is also preferably provided through the portal site 204. In a preferred embodiment, users can access EDA tool provider through the portal site 204 by activating a link to the website of the EDA tool provider. Problems arising from inadequate training of the user may be resolved by providing on-line training on an as-needed basis through the portal site 204 as well. Such training may be made available by the provider for a fee, and purchase of training services may be carried out generally according to, for example, the process 500 set forth in FIG. 5.

Figure 9:
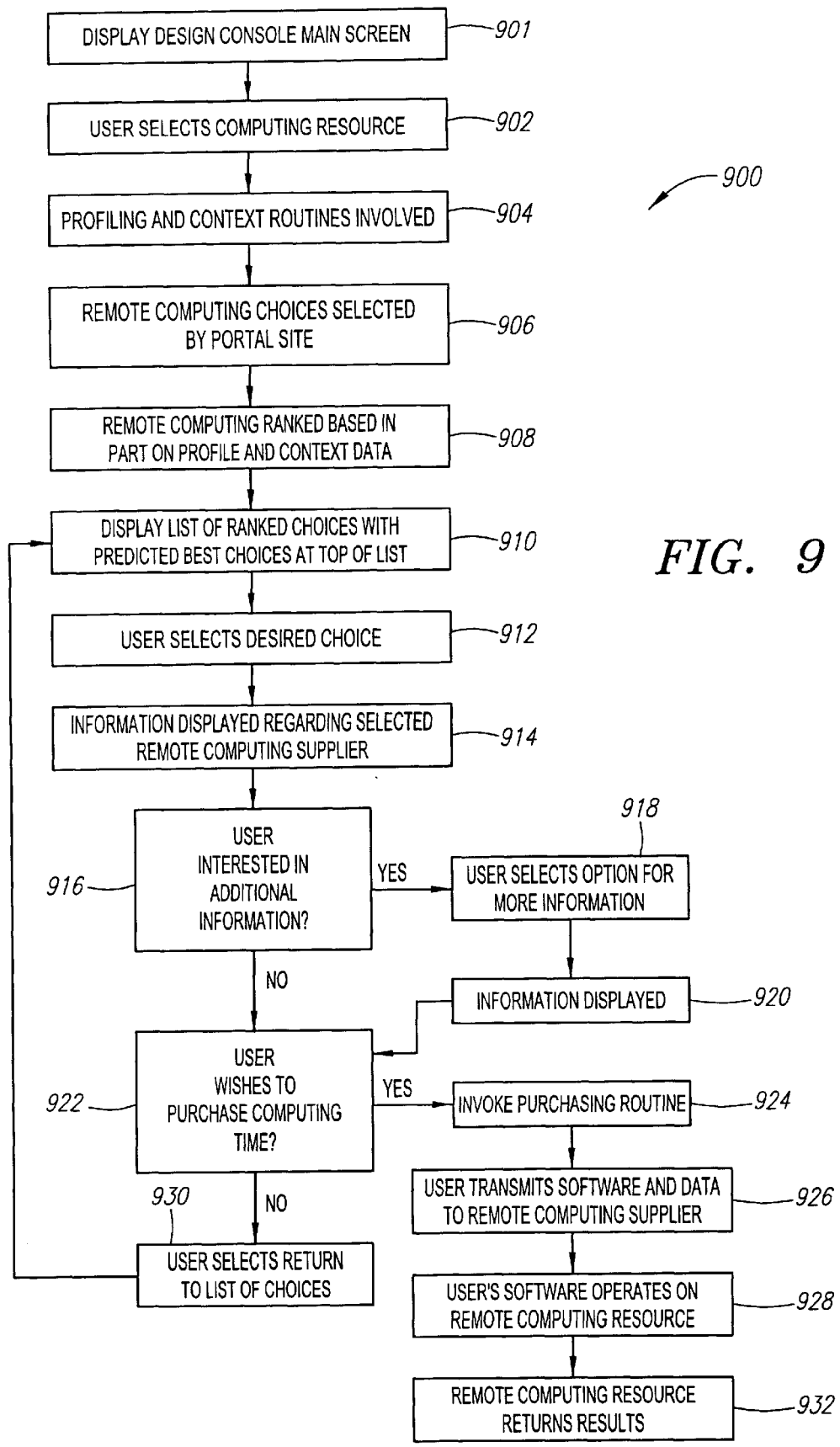
FIG. 9 is a flow chart illustrating a process for providing access to computing/processing resources through a portal site such as illustrated, for example, in FIG. 2.

FIG. 9 is a flow chart illustrating a process 900 for providing access to computing/processing resources through a portal site such as illustrated, for example, in FIG. 2. Such computing/processing resources may be physically located at remote computing farms 205, which can comprise dedicated, high performance mainframes or minicomputers or networked computers, or else can comprise computer network resources made available by participating companies when such computing resources are not being used (i.e., off hours). The computing and processing resources may be purchased or leased to support the operation of EDA tools either resident at the user system 220, or else leased or purchased through the portal site 204. A user can therefore avoid the need for an outright purchase or long-term lease of a necessary EDA tool and the hardware for running it, by leasing both the EDA tool and the computing resources to run it via the portal site 204.

Thus, in a first step 901 of the process 900 illustrated in FIG. 9, as with the processes previously described (e.g., with respect to FIGS. 3, 6 and 8), a user at the user system 220 preferably accesses the portal site 204 via the Internet 230 by entering the appropriate Unified Locator Resource (URL) or other applicable address. In response, the design console client software 228 displays a main design console menu screen on a computer screen at the user system 220. In a next step 802, the user at the user system 220 preferably selects an icon, link or other indicia for the computing/ processing resource. For example, the user may click on an appropriate icon or link displayed in the design console main screen so as to select the computing/processing resource, or by typing or entering an appropriate command. The user's selection is then transmitted over the Internet 230 to the portal site 204.

After the user selects the computing/processing resource, a list of different types of computing/processing sites or resources available for use or purchase is then retrieved at the portal site 204 from the catalog database 246, and transmitted to and displayed at the user system 220, the list appearing in a ranked ordering similar to that described with respect to FIGS. 3 and 6. To provide such a ranked ordering, in step 904, user profiling and context routines are preferably invoked. The user profiling and context routines are generally described in more detail herein with reference to FIG. 4. The process 900 then proceeds to step 906, wherein the application server 232 selects appropriate computing/ processing site or resource options for the user from the catalog data base 246 via the catalog server 244 based, for example, on the user's specific design (including the size of the design), the type of EDA tool being run, the user's profile data, and the context data obtained from step 904. In a next step 908, the application server 232 ranks the available computing/processing site or resource options, with the predicted best or most suitable choices for the user's design placed at the top of the listing, based on the available information. Other choices of available computing/ processing site or resource options preferably follow the best or most suitable options. In one aspect, the user benefits from past design experience of both his or her own design as well as that of other designers who have been in the position of making similar computing and processing resource choices in previous designs.

In a next step 910, the ranked list of available computing/ processing site or resource options is transmitted from the portal site 204 to the user system 220 and displayed for the user's perusal. The ranked list of available computing/ processing site or resource options may be displayed, for example, as a list of selectable strings, "hotlinks" or icons. The user reviews the ranked list of choices and, in step 912, selects one of the available choices by, e.g., highlighting the entry and hitting a keyboard key (such as the return key), clicking on the entry with a computer mouse, selecting a number corresponding to the ranking of the desired option, or by any other selection means, the specifics of which are not essential to the operation of the inventive concepts described herein. The user's selection is transmitted from the user system 220 to the portal site 204.

In a next step 914, information about the computing/ processing site or resource option chosen in step 912 is displayed. Such information preferably constitutes relatively high level data, such as availability of computing power (both in terms of overall cycles available and times of such availability) as well as usage rates, and is generally intended to allow the user to determine relatively quickly whether the user should find out more information about the computing/ processing site or resource, purchase or lease the services of the computing/processing site or resource, or obtain information about a different computing/processing site or resource. If the user is interested in additional information, the process 900 proceeds to step 918, wherein the user selects the appropriate interface feature (e.g., an icon or menu selection entry) to receive additional information about the selected computing/processing site or resource. The user's selection for more information is transmitted from the user system 220 to the portal site 204. In a next step 920, the further information concerning the selected computing/processing site or resource is displayed. Such information may include detailed information such as, for example, detailed pricing information, notes regarding the suitability of the computing resources to specific software suites and design task applications (for instance, some EDA tools and applications require short-term very high throughput, whereas others can operate with low throughput over a longer period), and other information of use to the user. The pricing structure may be such that larger amounts of computing time, or computing time that is required on a more immediate basis, will be priced higher.

If the user is not interested in the selected computing/processing site or resource, then the user may back out and return to step 910, whereupon the ranked list is again displayed for the user's perusal. If, on the other hand, the user is interested in purchasing or leasing the services of the selected computing/processing site or resource, then the process 900 proceeds to step 924, wherein a purchasing routine (such as that shown in FIG. 5) is invoked. In a next step 926, the user preferably delivers the design, and either the EDA software tool or instructions or a link to a leased EDA software tool, to the computing/processing site or resource provider. For example, the user may electronically transmit his or her design, and the EDA tool or instructions or a link to a leased EDA tool, to the computing/processing site or resource provider over the Internet 230. In one or more preferred embodiments, an EDA tool supplier 210 may work directly with a supplier of computing/processing resources (e.g., a computing farm) 205, and the EDA tool software may be transmitted directly from the EDA tool supplier 210 to the computing farm 205 in a way that is coordinated through the portal site 204 to minimize the complexity of the transaction.

In a next step 928, the software for the EDA tool software is run remotely at the computing farm 205 (or other remote computing resource) using the computing/processing resources purchased or leased by the user. The computing farm 205 (or other remote computing resource) returns the results of the completed run, as well as any software or data that is not owned by or licensed to the computing farm 205. Alternatively, such unlicensed software or data may simply be deleted by the computing farm 205 (or other remote computing resource) after return of the results to the end user.

The aforementioned process 900 permits owners of large computer networks, such as large companies having thousands of networked computers, to utilize those computers during off hours as a revenue source by making them available through the portal site 204 for usage by end users requiring computing time to run EDA tools and applications. Some companies or organizations may be solely devoted to the business of providing computing/processing resources on an as-needed basis. An advantage of the process 900 for purchasing/leasing computational resources, from the standpoint of the end user, is the ability to access large amounts of computing power as needed, without the requirement to purchase expensive computing hardware to meet short-term spikes in usage requirements. Often, large amounts of computing power are only needed at discrete points in the design process, such as simulation. The alternative—purchasing large computer systems simply for individual discrete points in the design process—can be inefficient and costly.

Figure 10:
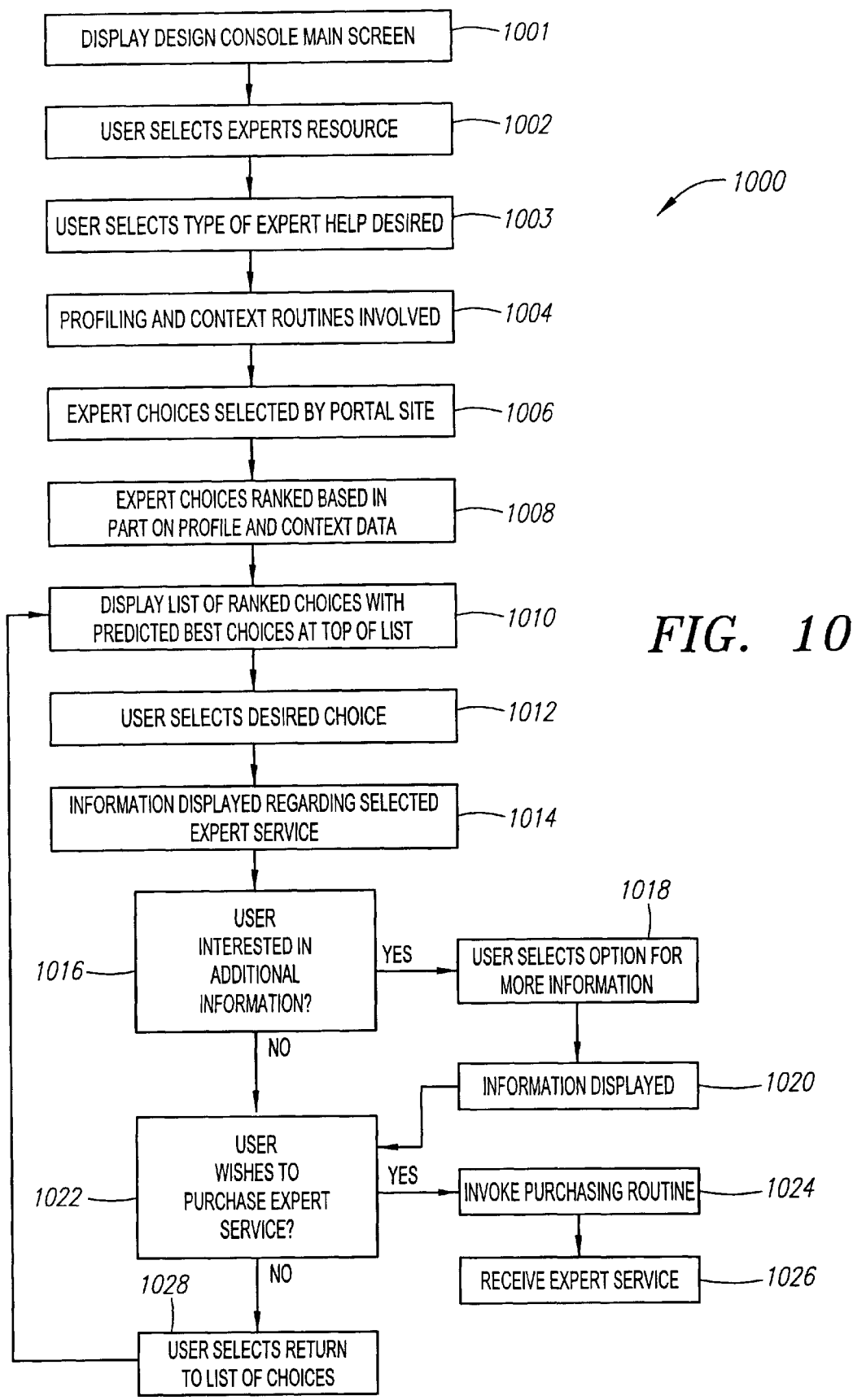
FIG. 10 is a flow chart illustrating a process for providing expert design assistance and services through a portal site such as illustrated, for example, in FIG. 2.

FIG. 10 is a flow chart illustrating a process 1000 for providing expert design assistance and services through a portal site such as illustrated, for example, in FIG. 2. One or more design experts 203 may be made available to designers working at user systems 220 to assist in various design problems. Access to the design experts 203 is preferably coordinated through the portal site 204, thereby providing an additional valuable resource for engineers and designers utilizing the portal site 204. The relatively rapid access to design experts assistance (in the form of both static textual materials and human interactions) provided by the portal site 204 helps minimize delays in the design process caused by the inconvenience of attempting to locate suitable expert publications, or design experts with the proper background and availability to be of assistance.

In a first step 1001 of the process 1000 of obtaining expert design assistance via the portal site 204, as with the processes previously described (e.g., with respect to FIGS. 3, 6, 8 and 9), a user at the user system 220 preferably accesses the portal site 204 via the Internet 230 by entering the appropriate Unified Locator Resource (URL) or other applicable address. In response, the design console client software 228 displays a main design console menu screen on a computer screen at the user system 220. In a next step 1002, the user at the user system 220 preferably selects an icon, link or other indicia for the design expert resource. For example, the user may click on an appropriate icon or link displayed in the design console main screen so as to select the design expert resource, or by typing or entering an appropriate command. The user's selection is then transmitted over the Internet 230 to the portal site 204.

After the user selects the design expert resource, a list of different design expert categories is then retrieved at the portal site 204 from the catalog database 246, and transmitted to and displayed at the user system 220. Examples of such categories may include, for example, codified knowledge, custom response, live response, and design outsourcing. In step 1003, the user selects an expert design assistance category, or alternatively, searches for an expert design assistance category or a particular expert with certain attributes, using a standard search tool providing by the design console client software 228.

The user's selection of the expert design assistance category results in a ranked list of experts for the selected design expert category appearing for the user (similar to the type of ranked list described with respect to FIGS. 3, 6, 8 and 9). To provide such a ranked ordering, in step 1004, user profiling and context routines are preferably invoked. The user profiling and context routines are generally described in more detail herein with reference to FIG. 4. The process 1000 then proceeds to step 1006, wherein the application server 232 selects appropriate design experts for the selected design expert category from the catalog data base 246 via the catalog server 244 based, for example, on the user's specific design, the stage of completion of the design, the type of EDA tool (if any) being run, the user's profile data and context data obtained from step 1004, and possibly data regarding the design expert, such as the design expert's availability (which may be updated periodically by the individual design expert 203). In a next step 1008, the application server 232 ranks the design experts, with the predicted best or most suitable choices placed at the top of the listing, based on the available information. Other choices of available design experts preferably follow the best or most suitable options. In one aspect, the user benefits from past design experience of both his or her own design as well as that of other designers who have been in the position of needing similar design expert assistance in previous designs.

In a next step 1010, the ranked list of design experts is transmitted from the portal site 204 to the user system 220 and displayed for the user's perusal. The ranked list of available design expert categories may be displayed, for example, as a list of selectable strings, "hotlinks" or icons. The user reviews the ranked list of choices and, in step 1012, selects one of the available choices by, e.g., highlighting the entry and hitting a keyboard key (such as the return key), clicking on the entry with a computer mouse, selecting a number corresponding to the ranking of the desired option, or by any other selection means, the specifics of which are not essential to the operation of the inventive concepts described herein. The user's selection is transmitted from the user system 220 to the portal site 204.

In a next step 1014, information about the selected design expert in step 1012 is displayed. Such information preferably includes, for example, data regarding the particular expertise and experience of the expert and rates charged by that expert for assistance, and is generally intended to allow the user to determine relatively quickly whether the user should find out more information about the design expert, employ the services of the design expert, or obtain information about a different design expert. If the user is interested in additional information, the process 1000 proceeds to step 1018, wherein the user selects the appropriate interface feature (e.g., an icon or menu selection entry) to receive additional information about the selected design expert. The user's selection for more information is transmitted from the user system 220 to the portal site 204. In a next step 1020, the further information concerning the selected design expert is displayed. Such information may include detailed information such as, for example, more detailed qualifications of the expert, the past achievements of the expert, more specific information concerning the rates of the design expert, contact information (e.g., address, telephone number, e-mail address, link to expert's website, etc.), and any other information which may help the end user to make a determination whether or not the given expert would be helpful.

It is contemplated that among the information displayed for the design expert will be the expert's "class of expertise." In a preferred embodiment, multiple classes of expertise are defined, ranging, for example, from least involvement from the expert to the greatest involvement of the expert. In an illustrative embodiment, such classes of expertise are four in number, and include the following classes: (i) codified knowledge, (ii) custom response, (iii) live response, and (iv) outsourcing of the entire design. The codified knowledge class of expertise is a category by which the user is allowed access to expert knowledge in the form of scientific journals and other printed publications placed on line. The custom response class of expertise involves a delayed exchange between the end user and the design expert 203 via e-mail or other messaging or communication means, whereby the design expert 203 reviews the design problem and transmits an appropriate response or advice to the user. The live response class of expertise involves a real-time connection between the end user and the design expert 203. The real-time connection may be accomplished, for example, by way of the Internet 230, video conferencing, teleconferencing, or actual face-to-face meetings. The design outsourcing class of expertise involves the user providing information concerning the actual design to the design expert 203, who then performs design services on a fee basis for the user.

If the user is not interested in the selected design expert, then the user may back out and return to step 1010, whereupon the ranked list is again displayed for the user's perusal. If, on the other hand, the user is interested in employing the services of the selected design expert, then the process 1000 proceeds to step 1024, wherein a purchasing routine (such as that shown in FIG. 5) is invoked. In a next step 1026, the user receives the expert services. If access to codified knowledge was purchased, relevant items are made available to the user. If other expert services were purchased, communication is initiated between the user and the design expert 203, in accordance with the type of expert services purchased. The user may be requested by the design expert 203 to deliver information concerning the user's design to the design expert 203, or else may utilize the collaboration features provided by the portal site 204 to allow the design expert to assist with the design process.

In the system 200 of FIG. 2, whenever it is mentioned herein that additional information is provided by the portal site 204 to the user system 220 concerning any of the design resources (e.g., components, electronic design automation tools, IP cores, design experts, etc.), such additional information may be provided by connecting the user system 220 to a different website (of, for example, the supplier, manufacturer, distributor, expert, etc.) through a hyperlink to the different website. To facilitate such a connection, the initial information transmitted from the portal site 204 to the user system 220 may contain one or more hyperlinks associating selection options with specific web locations (e.g., deep links) where the relevant information may be found. By activating the hyperlink, a web browser or other similar tool at the user system 220 may connect the user system 220 to the appropriate destination. Preferably, a tag or other information is appended to the address information (encoded or otherwise) within the hyperlink identifying the source (i.e., the portal site 204) from which the user was directed. The appended address information may be parsed out and stored at the destination website, so as to keep track of traffic directed to the destination website from the portal site 204. When the user is finished reviewing the information at the new destination, the user may backtrack to the portal site 204 using the ordinary capability of the web browser or other similar tool.

It will be appreciated that a portal site has been described having a wide variety of features, and a great deal of flexibility, for connecting circuit designers and engineers with suppliers and other resources useful to the design process. The portal site preferably provides an open infrastructure capable of accommodating a growing number of users and suppliers. Indeed, it is contemplated that the efficiency and utility of the system increases as the number of suppliers increases. As the number of suppliers increases, more services and goods are available, and the system is better able to meet the comprehensive needs of the users. The system also facilitates the participation of small suppliers, because the up-front cost of linking to the portal site can be much less than what the supplier might otherwise spend on overall sales and marketing efforts. From the perspective of the users, access to a larger number of EDA software tools on a per-use or other short-term basis is greatly expanded, rendering such tools more affordable and making them available to a larger number of end users. Likewise, access to substantial computing/processing resources also benefits the users by alleviating the need to purchase expensive hardware for running EDA tools.

In a preferred embodiment, the portal site 204 facilitates appropriate connections between different services and processes offered through the portal site 204. For example, a user may license an IP core from an IP core supplier 208 using the features of the portal site 204, request expert assistance from a design expert 203 (located and contacted through the portal site 204) for integrating the licensed IP core into a larger design, simulate the overall design (including the licensed IP core) using software obtained through the portal site 204 from an EDA tool supplier 210, and run the simulation on a computer farm 205 also made available through the portal site 204.

A preferred method for facilitating circuit design and providing design tools and services to users on a commercial basis has been disclosed, along with some of the attendant advantages thereof It will be apparent, however, that various changes may be made in the form, content and arrangement of the systems and/or process steps without departing from the spirit and scope of the invention, the systems and methods hereinbefore described being merely a preferred or exemplary embodiments thereof. Therefore, the invention is not to be restricted or limited except in accordance with any appended claims and their legal equivalents.

What is claimed is:

1. A system for providing remote resources for circuit design, comprising:
   a computer system comprising a catalog database, said computer system accessible over a distributed electronic network as a specified portal site, said catalog database storing component data for use in different stages of a design process, wherein said component data comprises a list of available components;
   a network interface managed by said computer system for receiving requests to access said component data over said distributed electronic network;
   an application server run on said computer system, said application server connected to said catalog database, wherein said application server presents said list of available components to a user upon receiving a request to access said component data; and
   a metrics database for maintaining prior usage information regarding visits by users to said portal site, said prior usage information comprising which option of a plurality of options was selected by a user and available characteristics of a design of the user when selecting said option.

2. The system of claim 1, wherein said application server presents said plurality of options to a user based upon said prior usage information maintained in said metrics database.

3. The system of claim 1, further comprising an affinity database for maintaining profile data relating to users accessing said portal site.

4. The system of claim 3, wherein said affinity database further comprises prior usage patterns of the portal site by one or more of said users.

5. The system of claim 4, wherein said application server presents said plurality of options to a user based upon said prior usage patterns maintained in said affinity database.

6. A method for providing circuit design resources from a plurality of suppliers to a plurality of end users, comprising:
   connecting, on a demand basis, a plurality of user system to a portal site over a distributed electronic network, said portal site comprising an application server interconnected with a plurality of databases, said plurality of databases include a database of component data for a plurality of available circuit components;
   connecting a plurality of supplier systems to said portal site over said distributed electronic network;
   receiving a request from at least one user system for access to said database of component data;
   automatically responding to said request from said at least one user system;
   transmitting component data from said portal site to said at least one user system;
   retrieving a stored user profile for a user at one of said user systems; and
   suggesting to the user a next action at the portal site based upon the closeness of the stored user profile to the user's current status.

7. A method for providing circuit design resources from a plurality of providers to a plurality of end users, comprising the steps of:
   receiving a user request at a portal site for a listing of providers of integrated circuit fabrication services, said user request received from a user system over a distributed electronic network;
   obtaining a list of providers of integrated circuit fabrication services from a database;
   transmitting said list of providers of integrated circuit fabrication services to said user system over said distributed electronic network;
   receiving at the portal site, over said distributed electronic network, a selection from the user system of one of said providers of integrated circuit fabrication services;
   obtaining additional information regarding the selected provider of integrated circuit fabrication services from said database;
   transmitting said additional information to said user system over said distributed electronic network; and
   receiving at the portal site, over said distributed electronic network, a selection from said user system of the selected provider of integrated circuit fabrication services for use.

8. The method of claim 7, further comprising the steps of:
   invoking a purchasing routine; and
   connecting the user system to the selected provider of integrated circuit fabrication services.

9. The method of claim 8, wherein said step of invoking said purchasing routine comprises the steps of:
   transmitting, from a user logged on said user system, a request for a price quote to the selected provider of integrated circuit fabrication services over said distributed electronic network;
   generating an electronic offer at the provider;
   transmitting said electronic offer from the provider to said user system over said distributed electronic network;
   receiving a message from said user system accepting or declining said electronic offer; if the offer is accepted, determining whether said user is authorized to accept said electronic offer; and
   transmitting an electronic acceptance to the provider over said distributed electronic network.

10. The method of claim 9, further comprising the steps of:
    transmitting an electronic invoice from said selected provider of integrated circuit fabrication services to said user system over said distributed electronic network; and
    remitting a transaction fee from the provider to said portal site.

11. The method of claim 9, further comprising the steps of:
    generating an electronic invoice at said portal site;
    transmitting said electronic invoice from said portal site to said user system over said distributed electronic network;
    receiving payment for said electronic invoice from said user;
    deducting a transaction fee from said payment at said portal site; and
    remitting the remainder of said payment to said selected provider of integrated circuit fabrication services.

12. The method of claim 7, further comprising the steps of:
    invoking profiling and context routines at said portal site in response to receiving a user request at a portal site for a listing of providers of integrated circuit fabrication services; and
    ordering said listing of providers of integrated circuit fabrication services based at least in part upon results of said profiling and context routines.

13. The method of claim 12, wherein said profiling and context routines include the steps of:

identifying a specific user connected to said portal site;
   retrieving profile data regarding the specific user from an affinity database if said user is identified;
   retrieving metrics data regarding a plurality of users from a metrics database; and
   using said profile data and metrics data in said step of ordering said listing of providers of integrated circuit fabrication services.

14. The method of claim 13, wherein said profile data includes prior purchases by the specific user.

15. The method of claim 13, wherein said profile data includes prior usage patterns of the portal site by the specific user.

16. The method of claim 13, wherein said metrics data includes prior purchases by other users having similar designs.

17. The method of claim 13, wherein said metrics data includes prior usage patterns of the portal site by other users having similar designs.

18. The method of claim 7, wherein said distributed electronic network comprises the Internet.

19. The method of claim 7, further comprising the steps of:

receiving a request from said user system over said distributed electronic network for component data;
   transmitting a list of component categories to said user system over said distributed electronic network;
   receiving a component category selection from said user system over said distributed electronic network;
   retrieving, from a component database, a list of available components corresponding to said component category selection; and
   transmitting said list of available components to said user system over said distributed electronic network.

20. The method of claim 19, wherein said component data comprises component value and tolerance information.

21. The method of claim 19, further comprising the steps of:

receiving, from said user system over said distributed electronic network, a component selection of one of said available electronic components;
   retrieving further information regarding the selected electronic component; and
   transmitting said further information regarding the selected electronic component to said user system over said distributed electronic network.

22. The method of claim 21, wherein said further information comprises symbol and footprint data for the selected electronic component.

23. The method of claim 19, wherein said component data comprises a link to providers of said available electronic components.

24. The method of claim 19, further comprising the steps of:

receiving a request from said user system over said distributed electronic network for purchase of one of said available electronic components;
   invoking a purchasing routine; and
   informing a provider of said one available electronic component of said request for purchase.

25. The method of claim 7, further comprising the step of providing information and services regarding virtual circuit blocks at said portal site.

26. The method of claim 25, further comprising the steps of:

receiving a request from said user system over said distributed electronic network for virtual circuit block data;
   transmitting a list of virtual circuit block categories to said user system over said distributed electronic network;
   receiving a virtual circuit block category selection from said user system over said distributed electronic network;
   retrieving, from a virtual circuit block database, a list of available virtual circuit blocks corresponding to said virtual circuit block category selection; and
   transmitting said list of available virtual circuit blocks to said user system over said distributed electronic network.

27. The method of claim 26, further comprising the step of:

receiving, from said user system over said distributed electronic network, a selection of one of said virtual circuit blocks; and
   providing the selected virtual circuit block to said user system by transmitting said virtual circuit block over said distributed electronic network.

28. The method of claim 26, further comprising the steps of receiving a request from said user system over said distributed electronic network for further information regarding said virtual circuit blocks;
   retrieving further information regarding said virtual circuit blocks at said portal site; and
   transmitting said further information regarding said virtual circuit blocks to said user system over said distributed electronic network.

29. The method of claim 28, wherein said further information regarding said virtual circuit blocks comprises design data format information and integration information relating to a specified virtual circuit block.

30. The method of claim 7, further comprising the step of providing electronic design automation information and services over said distributed electronic network via said portal site.

31. The method of claim 30, comprising the steps of:

receiving a request from said user system over said distributed electronic network for electronic design automation tool information;
   transmitting a list of electronic design automation tool categories to said user system over said distributed electronic network;
   receiving an electronic design automation tool category selection from said user system over said distributed electronic network;
   retrieving, from an electronic design automation tool database, a list of electronic design automation tools corresponding to said electronic design automation tool category selection; and
   transmitting said list of electronic design automation tools to said user system over said distributed electronic network.

32. The method of claim 31, further comprising the step of:

receiving, from said user system over said distributed electronic network, a selection of one of said electronic design automation tools; and providing the selected electronic design automation tool to said user system by transmitting software for said electronic design automation tool over said distributed electronic network.

33. The method of claim 31, further comprising the steps of
receiving a request from said user system over said distributed electronic network for further information regarding said electronic design automation tools;
retrieving further information regarding said electronic design automation tools at said portal site; and
transmitting said further information regarding said electronic design automation tools to said user system over said distributed electronic network.

34. The method of claim 7, further comprising the step of providing information and services regarding computational and processing resources provided at remote sites accessible over said distributed electronic network.

35. The method of claim 34, comprising the steps of:
receiving a request from said user system over said distributed electronic network for remote computing resources information;
retrieving, from an remote computing resources database, a list of remote computing resource service providers; and
transmitting said list of remote computing resource service providers to said user system over said distributed electronic network.

36. The method of claim 35, further comprising the step of:
receiving, from said user system over said distributed electronic network, a selection of one of said remote computing resource service providers; and
providing access to said user system of computing resources at the selected remote computing resource service provider.

37. The method of claim 36, further comprising the step of transmitting, over said distributed electronic network and via said portal site, electronic design automation tool software and design data to the selected remote computing resource provider.

38. The method of claim 7, further comprising the step of providing information and services regarding experts at said portal site.

39. The method of claim 38, comprising the steps of:
receiving a request from said user system over said distributed electronic network for expert design service information;
transmitting a list of expert design service categories to said user system over said distributed electronic network;
receiving an expert design service category selection from said user system over said distributed electronic network;
retrieving, from an electronic design automation tool database, a list of experts corresponding to said expert design service category selection; and
transmitting said list of experts to said user system over said distributed electronic network.

40. The method of claim 39, further comprising the step of:
receiving, from said user system over said distributed electronic network, a selection of one of said experts; and
providing information to said user system or the selected expert to facilitate connection between said user system and said expert.

41. A method for design knowledge capture in a portal site adapted for transacting commerce relating to electronic design, comprising the steps of:
tracking movements of a plurality of users through the portal site;
storing, in a metrics database, said movements of said users through the portal site;
obtaining design data regarding the electronic design projects of said users and the information and services purchased by said users through the portal site; and
suggesting options for navigating through said portal site to a visiting user based upon the information stored in said metrics database for said users similarly situated to the visiting user.

42. The method of claim 41, further comprising:
storing, in a catalog database, a plurality of design resources;
receiving a request from the visiting user for access to any of the plurality of design resources; and
automatically responding to the request from the visiting user.

43. The method of claim 42, wherein the plurality of design resources comprise component data for a plurality of available electrical components.

44. The method of claim 43, wherein receiving a request from the visiting user for access to any of the plurality of design resources comprises receiving a request from the visiting user for component data and wherein automatically responding to the request from the visiting user comprises transmitting component data to the visiting user.

45. The method of claim 43, wherein the component data comprises one or more of the following: component data sheets, links to suppliers of the plurality of available electrical components, timing models, application notes, simulation models, and signal integrity models.

46. The method of claim 42, wherein the plurality of design resources comprise electronic design automation software tools.

47. The method of claim 46, wherein receiving a request from the visiting user for access to any of the plurality of design resources comprises receiving a request from the visiting user for an electronic design automation software tool and wherein automatically responding to the request from the visiting user comprises providing the visiting user access to the electronic design automation software tool for a designated fee.

48. The method of claim 42, wherein the catalog-database comprises electronic links to one or more provider databases.

49. A computer program product that includes a computer-readable medium having a sequence of instructions which, when executed by a processor, causes the processor to execute a process for providing circuit design resources from a plurality of providers to a plurality of end users, the process comprising:
receiving a user request at a portal site for a listing of providers of integrated circuit fabrication services, said user request received from a user system over a distributed electronic network;
obtaining a list of providers of integrated circuit fabrication services from a database;
transmitting said list of providers of integrated circuit fabrication services to said user system over said distributed electronic network;
receiving at the portal site, over said distributed electronic network, a selection from the user system of one of said providers of integrated circuit fabrication services;

obtaining additional information regarding the selected provider of integrated circuit fabrication services from said database;

transmitting said additional information to said user system over said distributed electronic network; and receiving at the portal site, over said distributed electronic network, a selection from said user system of the selected provider of integrated circuit fabrication services for use.

50. The computer program product of claim 49, wherein the process further comprises:

invoking a purchasing routing; and connecting the user system to the selected provider of integrated circuit fabrication services.

51. The computer program product of claim 49, wherein the process further comprises:

invoking profiling and context routines at said portal site in response to receiving a user request at a portal site for a listing of providers of integrated circuit fabrication services; and ordering said listing of providers of integrated circuit fabrication services based at least in part upon results of said profiling and context routines.

52. The computer program product of claim 49, wherein the process further comprises:

receiving a request from said user system over said distributed electronic network for component data;

transmitting a list of component categories to said user system over said distributed electronic network;

receiving a component category selection from said user system over said distributed electronic network;

retrieving, from a component database, a list of available components corresponding to said component category selection; and transmitting said list of available components to said user system over said distributed electronic network.

53. The computer program product of claim 49, wherein the process further comprises:

providing information and services regarding virtual circuit blocks at said portal site;

receiving a request from said user system over said distributed electronic network for virtual circuit block data;

transmitting a list of virtual circuit block categories to said user system over said distributed electronic network;

receiving a virtual circuit block category selection from said user system over said distributed electronic network;

retrieving, from a virtual circuit block database, a list of available virtual circuit blocks corresponding to said virtual circuit block category selection; and transmitting said list of available virtual circuit blocks to said user system over said distributed electronic network.

54. The computer program product of claim 49, wherein the process further comprises:

providing electronic design automation information and services over said distributed electronic network via said portal site;

receiving a request from said user system over said distributed electronic network for electronic design automation tool information;

transmitting a list of electronic design automation tool categories to said user system over said distributed electronic network;

receiving an electronic design automation tool category selection from said user system over said distributed electronic network;

receiving, from an electronic design automation tool database, a list of electronic design automation tools corresponding to said electronic design automation tool category selection; and transmitting said list of electronic design automation tools to said user system over said distributed electronic network.

55. The computer program product of claim 49, wherein the process further comprises:

providing information and services regarding computational and processing resources provided at remote sites accessible over said distributed electronic network;

receiving a request from said user system over said distributed electronic network for remote computing resources information;

retrieving, from a remote computing resources database, a list of remote computing resource service providers; and transmitting said list of remote computing resource service providers to said user system over said distributed electronic network.

56. The computer program product of claim 49, wherein the process further comprises:

providing information and services regarding experts at said portal site;

receiving a request from said user system over said distributed electronic network for expert design service information;

transmitting a list of expert design service categories to said user system over said distributed electronic network;

receiving an expert design service category selection from said user system over said distributed electronic network;

retrieving, from an electronic design automation tool database, a list of experts corresponding to said expert design service category selection; and transmitting said list of experts to said user system over said distributed electronic network.

57. A system for providing circuit design resources from a plurality of providers to a plurality of end users, comprising:

means for receiving a user request at a portal site for a listing of providers of integrated circuit fabrication services, said user request received from a user system over a distributed electronic network;

means for obtaining a list of providers of integrated circuit fabrication services from a database;

means for transmitting said list of providers of integrated circuit fabrication services to said user system over said distributed electronic network;

means for receiving at the portal site, over said distributed electronic network, a selection from the user system of one of said providers of integrated circuit fabrication services;

means for obtaining additional information regarding the selected provider of integrated circuit fabrication services from said database;

means for transmitting said additional information to said user system over said distributed electronic network; and means for receiving at the portal site, over said distributed electronic network, a selection from said user system of the selected provider of integrated circuit fabrication services for use.

58. The system of claim 57, further comprising:

means for invoking a purchasing routing; and means for connecting the user system to the selected provider of integrated circuit fabrication services.

59. The system of claim 57, further comprising:

means for invoking profiling and context routines at said portal site in response to receiving a user request at a portal site for a listing of providers of integrated circuit fabrication services; and means for ordering said listing of providers of integrated circuit fabrication services based at least in part upon results of said profiling and context routines.

60. The system of claim 57, further comprising:

means for receiving a request from said user system over said distributed electronic network for component data;

means for transmitting a list of component categories to said user system over said distributed electronic network;

means for receiving a component category selection from said user system over said distributed electronic network;

means for retrieving, from a component database, a list of available components corresponding to said component category selection; and means for transmitting said list of available components to said user system over said distributed electronic network.

61. The system of claim 57, further comprising:

means for providing information and services regarding virtual circuit blocks at said portal site;

means for receiving a request from said user system over said distributed electronic network for virtual circuit block data;

means for transmitting a list of virtual circuit block categories to said user system over said distributed electronic network;

means for receiving a virtual circuit block category selection from said user system over said distributed electronic network;

means for retrieving, from a virtual circuit block database, a list of available virtual circuit blocks corresponding to said virtual circuit block category selection; and means for transmitting said list of available virtual circuit blocks to said user system over said distributed electronic network.

62. The system of claim 57, further comprising:

means for providing electronic design automation information and services over said distributed electronic network via said portal site;

means for receiving a request from said user system over said distributed electronic network for electronic design automation tool information;

means for transmitting a list of electronic design automation tool categories to said user system over said distributed electronic network;

means for receiving an electronic design automation tool category selection from said user system over said distributed electronic network;

means for receiving, from an electronic design automation tool database, a list of electronic design automation tools corresponding to said electronic design automation tool category selection; and means for transmitting said list of electronic design automation tools to said user system over said distributed electronic network.

63. The system of claim 57, further comprising:

means for providing information and services regarding computational and processing resources provided at remote sites accessible over said distributed electronic network;

means for receiving a request from said user system over said distributed electronic network for remote computing resources information;

means for retrieving, from a remote computing resources database, a list of remote computing resource service providers; and means for transmitting said list of remote computing resource service providers to said user system over said distributed electronic network.

64. The system of claim 57, further comprising:

means for providing information and services regarding experts at said portal site;

means for receiving a request from said user system over said distributed electronic network for expert design service information;

means for transmitting a list of expert design service categories to said user system over said distributed electronic network;

means for receiving an expert design service category selection from said user system over said distributed electronic network;

means for retrieving, from an electronic design automation tool database, a list of experts corresponding to said expert design service category selection; and means for transmitting said list of experts to said user system over said distributed electronic network.

* * * * *

UNITED STATES PATENT AND TRADEMARK OFFICE
CERTIFICATE OF CORRECTION

PATENT NO. : 6,594,799 B1
DATED : July 15, 2003
INVENTOR(S) : William H. Robertson et al.

It is certified that error appears in the above-identified patent and that said Letters Patent is hereby corrected as shown below:

Column 34,
Line 47, please replace "catalogue-database" with -- catalogue database --

Signed and Sealed this

Twenty-eighth Day of October, 2003

JAMES E. ROGAN
*Director of the United States Patent and Trademark Office*